(12) United States Patent
Hinata et al.

(10) Patent No.: US 7,057,681 B2
(45) Date of Patent: Jun. 6, 2006

(54) LIQUID CRYSTAL DISPLAY WITH MIRROR MODE HAVING TOP REFLECTIVE POLARIZER

(75) Inventors: Shoji Hinata, Matsumoto (JP); Tsuyoshi Maeda, Yamanashi-ken (JP)

(73) Assignee: Seiko Epson Corporation (JP)

(*) Notice: Subject to any disclaimer, the term of this patent is extended or adjusted under 35 U.S.C. 154(b) by 8 days.

(21) Appl. No.: 10/603,057

(22) Filed: Jun. 24, 2003

(65) Prior Publication Data
US 2004/0051827 A1    Mar. 18, 2004

(30) Foreign Application Priority Data
Jun. 24, 2002  (JP)  .............................. 2002-183490
Aug. 7, 2002   (JP)  .............................. 2002-230295

(51) Int. Cl.
*G02F 1/1335* (2006.01)

(52) U.S. Cl. .................. 349/96; 349/113; 349/114; 349/115

(58) Field of Classification Search ............ 349/96–98, 349/67, 113–114, 123
See application file for complete search history.

(56) References Cited

U.S. PATENT DOCUMENTS

| | | | | |
|---|---|---|---|---|
| 4,902,103 | A * | 2/1990 | Miyake et al. | ............... 349/144 |
| 5,400,158 | A * | 3/1995 | Ohnishi et al. | ............. 349/119 |
| 6,222,689 | B1 * | 4/2001 | Higuchi et al. | ............. 359/837 |
| 6,271,901 | B1 | 8/2001 | Ide et al. | |
| 6,317,180 | B1 * | 11/2001 | Kuroiwa et al. | ............... 349/96 |
| 6,414,910 | B1 * | 7/2002 | Kaneko et al. | ............. 368/242 |
| 6,462,795 | B1 * | 10/2002 | Clarke | ......................... 349/95 |
| 6,519,209 | B1 | 2/2003 | Arikawa et al. | |
| 6,525,707 | B1 * | 2/2003 | Kaneko et al. | ............... 345/88 |
| 6,538,709 | B1 * | 3/2003 | Kurihara et al. | ............... 349/58 |
| 6,559,902 | B1 * | 5/2003 | Kusuda et al. | ................ 349/12 |
| 6,573,957 | B1 * | 6/2003 | Suzuki | ......................... 349/73 |
| 6,624,936 | B1 * | 9/2003 | Kotchick et al. | ........... 359/490 |
| 6,646,697 | B1 | 11/2003 | Sekiguchi et al. | |
| 6,661,482 | B1 * | 12/2003 | Hara | ............................ 349/96 |
| 6,690,438 | B1 * | 2/2004 | Sekiguchi | ................... 349/114 |
| 2003/0063236 | A1 * | 4/2003 | Watson et al. | ................ 349/96 |
| 2003/0066236 | A1 * | 4/2003 | Weder et al. | ................... 47/72 |
| 2004/0100598 | A1 | 5/2004 | Adachi et al. | |

FOREIGN PATENT DOCUMENTS

CN   1189224 A   7/1998
CN   1273643 A   11/2000

(Continued)

OTHER PUBLICATIONS

Communication from European Patent Office regarding counterpart application.

(Continued)

*Primary Examiner*—Andrew Schechter
*Assistant Examiner*—Phu Vu
(74) *Attorney, Agent, or Firm*—Harness, Dickey & Pierce, P.L.C.

(57) ABSTRACT

In a display device 100, a reflective polarizer 110, a polarizer 120, a retarder 130, a liquid crystal panel 140, a polarizer 150, and a backlight 160 are disposed sequentially from the viewing side. When the liquid crystal panel 140 is set in a light blocking state or the backlight 160 is set in an unlit state, the reflection of an outside light "O" turns the display screen into a mirror state. When the backlight 160 is set in a lit state to drive the liquid crystal panel 140, a transmitted light "T" allows a particular display screen to be visually recognized.

34 Claims, 12 Drawing Sheets

FOREIGN PATENT DOCUMENTS

| | | |
|---|---|---|
| EP | 0 933 663 | 7/1998 |
| JP | 52-146988 | 11/1977 |
| JP | 10-206643 | 8/1998 |
| JP | 11-160539 | 6/1999 |
| JP | 11-508377 | 7/1999 |
| JP | 2001-083509 | 3/2001 |
| JP | 2001-201764 | 7/2001 |
| JP | 2001-242450 | 7/2001 |
| JP | 2001-318374 | 11/2001 |
| WO | WO 97/01789 | 1/1997 |

OTHER PUBLICATIONS

Communication from Japanese Patent Office re: counterpart application.

Translation of communication from Chinese Patent Office re: related application.

Communication from Korean Patent Office re: counterpart application.

Communication from Japanese Patent Office re: counterpart application.

* cited by examiner

100

100

FIG. 7
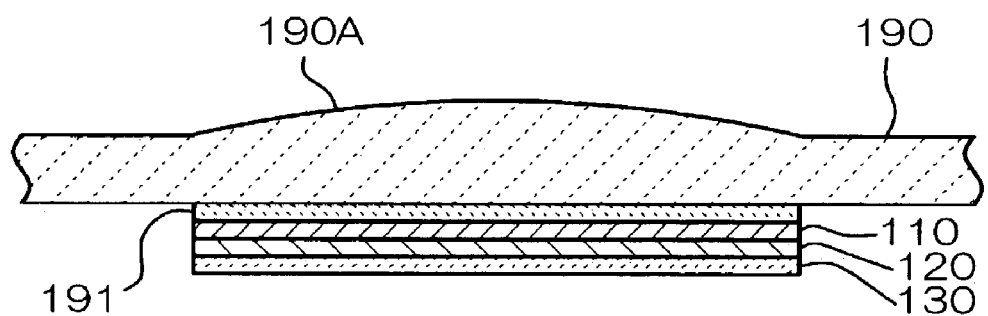
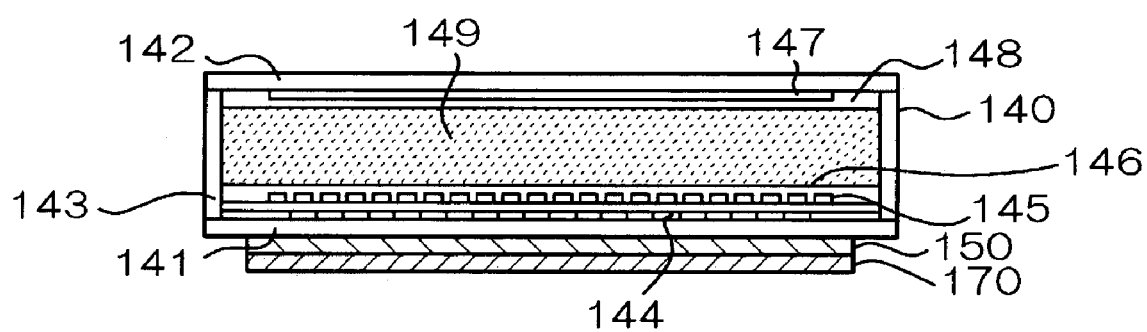
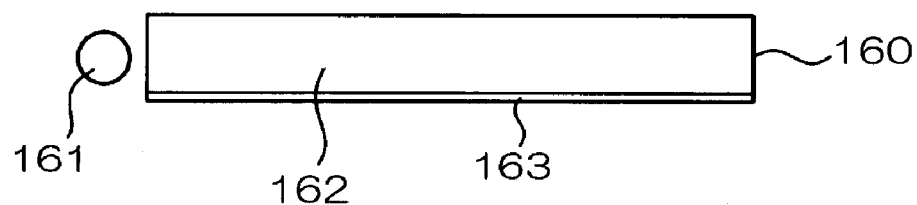

LIQUID CRYSTAL DISPLAY WITH MIRROR MODE HAVING TOP REFLECTIVE POLARIZER

BACKGROUND OF THE INVENTION

1. Field of the Invention

The present invention relates to a display device and an electronic device having the same, and more particularly to a configuration suitable for a display capable of switching a display screen between a display mode and a mirror mode.

2. Related Art

Traditionally, a display device has been known in which two liquid crystal panels are overlaid to switch between the display mode to perform normal display and the mirror mode to change the whole piece into a mirror surface state. For example, there is a display device in which a display switching part is disposed on the viewing side of a display part having the same structure as the general liquid crystal display device and the display switching part is disposed with a reflective type polarizer, a liquid crystal panel and an absorption type polarizer sequentially from the display part side to the viewing side. In this display device, the reflective type polarizer (hereafter, it is simply called reflective polarizer) of the display switching part transmits a first polarized light, and reflects a second polarized light having a polarization axis orthogonal to the first polarized light. The liquid crystal panel is configured to allow switching between the state that the first polarized light is changed to the second polarized light for transmission and the state that the polarization axis is not changed for transmission. The absorption type polarizer transmits the first polarized light and absorbs the second polarized light, for example. The display part emits the first polarized light to the display switching part, and the first polarized light forms a predetermined display image.

In the display device configured as above, when the liquid crystal panel of the display switching part is in the state that the polarization axis is not changed for transmission, the first polarized light emitted from the display part passes through the reflective polarizer to enter the liquid crystal panel and passes through the absorption type polarizer as the first polarized light for observation. Thus, the display condition of the display part can be visibly recognized (the display mode). When the liquid crystal panel is in the state that the first polarized light is changed into the second polarized light for transmission, the first polarized light emitted from the display part passes through the reflective polarizer to enter the liquid crystal panel, and it is changed into the second polarized light. Thus, it is absorbed by the absorption type polarizer and the display condition is not visually recognized. At this time, when an outside light enters the device, the outside light passes through the absorption type polarizer to be a first polarized light and passes through the liquid crystal panel to be a second polarized light. Therefore, it is reflected by the reflective polarizer, and it passes through the liquid crystal panel again to be changed into the first polarized light, and it passes through the absorption type polarizer. Accordingly, the display plane is visibly recognized as a mirror surface (the mirror mode).

In the traditional display device, the light having passed through the liquid crystal panel, disposed in the display switching part, is visibly recognized in both the display mode and the mirror mode. Therefore, the following problems tend to occur: a reduction in contrast due to the interface reflection in the front and back sides of the display switching part, coloring, the deterioration of the viewing angle property, and a blurred display image due to the optical property of the display switching part. In any case, in the traditional display device, degraded display quality is inevitable due to the double structure of the display part and the display switching part.

Furthermore, in the configuration described above, the display switching part including the liquid crystal panel is further disposed on the viewing side of the normal display part. Thus, there is a problem that the device becomes thicker and heavier. This problem becomes a great disadvantage because portability is impaired, particularly, when the device is mounted in a portable electronic device.

To solve the above problems, the present invention provides a novel configuration of a display device capable of suppressing the degradation of display quality such as a reduction in contrast, coloring, a narrowed viewing angle and blurring due to the existence of the display switching part, and is formed to be low-profile and light-weight.

SUMMARY

In order to solve the above problems, a first display device of the invention is a display device characterized by having:

a display unit adapted to allow a first polarized light to be emitted as display light; and a control unit adapted to control the display unit, wherein the display unit has a polarized light selecting unit on a viewing side thereof, the polarized light selecting unit transmits the first polarized light and reflects a second polarized light having a polarization axis crossing a polarization axis of the first polarized light, and the control unit switches between a display mode, in which the first polarized light is emitted from the display unit as display light, and a mirror mode, in which the first polarized light is not emitted from the display unit.

According to the invention, the display unit includes the polarized light selecting unit disposed on the viewing side. The polarized light selecting unit is configured to transmit the first polarized light and reflect the second polarized light.

Therefore, the first polarized light passing through the polarized light selecting unit is emitted from the display unit as display light. In addition, the first polarized light included in the outside light passes through the polarized light selecting unit to enter the opposite side of the viewing side, and the second polarized light included in the outside light is reflected by the polarized light selecting unit.

The high intensity light in the outside light generally enters in the direction different from the viewing direction of a viewer. Thus, the specular reflection of the high intensity outside light is difficult to view. Therefore, in the display mode that display light is visibly recognized from the display unit through the polarized light selecting unit, the display condition, based on the display light emitted from the display unit, can be visibly recognized. On the other hand, when the mirror mode is set by control of the control unit, the first polarized light is not emitted from the display unit. Thus, the light emitted from the display unit does not reach the viewing side. Therefore, the surface on the viewing side of the polarized light selecting unit is visibly recognized as a mirror surface by the reflected light of the outside light.

As described above, in the invention, the polarized light selecting unit is simply disposed on the viewing side as a component included in the display unit. Therefore, the configuration can be formed in which a transmitting polarization axis varying unit is not disposed on the viewing side of the polarized light selecting unit.

Accordingly, as compared with the case where the transmitting polarization axis varying unit, such as a liquid crystal panel, is disposed on the viewing side of the traditional display unit, the degradation of display quality such as a reduction in contrast due to the interface reflection, coloring, deterioration of the viewing angle property, and blurred display images due to the optical property of the display switching part can be avoided. Furthermore, a simple structure can be formed without the double panel structure. Therefore, the thickness of the device can be reduced and the weight can be decreased.

The control unit preferably stops the light emission from the display unit in the mirror mode. Accordingly, the display unit does not emit light, thus the mirror surface quality in the mirror mode can be further enhanced.

Moreover, a polarized light selecting area of the polarized light selecting unit is preferably extended beyond an area overlapping with a display area of the display unit. Thus, the display unit (an electro-optical panel such as a liquid crystal panel) generally requires the structure portion extending beyond its display area (so-called frame area). Therefore, in the area overlapping with the structure portion, the polarized light selecting area of. the polarized light selecting unit can be extended without increasing the plan dimension of the display device. Accordingly, the space inside the display device can be utilized effectively, and the range (area) to be visibly recognized as a mirror in the mirror mode can be expanded relatively with respect to the outer dimensions of the display device.

The light amount emitted in the normal direction is preferably greatest in the emission angle distribution of the display light of the display unit. The light amount emitted in the normal direction is set greatest, and thus the ratio of light entering the user's eye for supporting display can be enhanced in the display light. Therefore, the influence of external light reflection by the polarized light selecting unit can be reduced, and display quality can be enhanced.

In this case, the display light is desirably distributed mainly at an emission angle ranging from zero (0) to forty (40) degrees. In this range of the emission angle, an amount of the emitted outside light is relatively small. Thus, display quality can be enhanced with no influence of external light reflection.

In addition, the display light in the range exceeding an emission angle of forty five (45) degrees is desirably one fiftieth (1/50) or below of the light amount in the normal direction. The light in the range exceeding the emission angle of forty five (45) degrees hardly supports display. Therefore, unnecessary light is reduced to efficiently configure the display condition.

In each invention, the display unit is preferably configured of an electro-optical device. By configuring the display unit with electro-optical devices, a low-profile structure can be provided and a display device also applicable to a portable device can be realized. Particularly, the display device of the invention can configure the display screen as a mirror surface in the mirror mode by switching. Therefore, it can also be utilized as a hand mirror configured of a portable device.

Next, a second display device of the invention is a display device having a transmitting polarization axis varying unit characterized by including:

a first polarized light selecting unit disposed on a viewing side of the transmitting polarization axis varying unit; and a second polarized light selecting unit disposed on a backside of the transmitting polarization axis varying unit, wherein the first polarized light selecting unit transmits a first polarized light and reflects a second polarized light having a polarization axis crossing a polarization axis of the first polarized light, the second polarized light selecting unit transmits a third polarized light and absorbs or reflects a fourth polarized light having a polarization axis crossing a polarization axis of the third polarized light, and the transmitting polarization axis varying unit is allowed to convert at least a part of the third polarized light to the first polarized light.

According to the invention, the first polarized light selecting unit (reflective polarizer) disposed on the viewing side reflects the outside light. Thus, the display screen is allowed to be set in the mirror mode, when the liquid crystal panel does not emit light. When the liquid crystal panel emits light, the display screen is allowed to be set in the display mode. The outside light has a greater light amount incident obliquely with respect to the user. Thus, a high intensity specular reflection light generated in the first polarized light selecting unit due to the outside light is not visually recognized by the user. Therefore, by intensifying the emitting light from the liquid crystal panel to some extent, display quality in the display mode can be secured. In addition, the mirror mode can be substantially realized only by the first polarized light selecting unit. Accordingly, the degraded display quality due to the double panel structure can be avoided, and the display device can be formed to be low-profile and light-weight.

In the invention, another transmitting polarization axis varying unit is preferably not disposed on the viewing side of the first polarized light selecting unit. A reduction in visibility can be suppressed in the display mode by not disposing another transmitting polarization axis varying unit (a liquid crystal panel, for example) on the viewing side of the first polarized light selecting unit.

In the invention, a third polarized light selecting unit, adapted to transmit the first polarized light and to absorb the second polarized light, is preferably disposed between the first polarized light selecting unit and the transmitting polarization axis varying unit. Generally, the polarized light selectivity of a member available as the first polarized light selecting unit (reflective polarizer) is lower than the polarized light selectivity of the absorption type polarizer. Thus, a contrast in the display mode drops when the member is used as it is, but a disposition of the third polarized light selecting unit (absorption type polarizer) enhances the polarized light selectivity. Therefore, display contrast can be enhanced.

Preferably, this case has a lighting device on the backside of the second polarized light selecting unit, wherein the second polarized light selecting unit transmits the third polarized light and absorbs the fourth polarized light, a fourth polarized light selecting unit is disposed between the second polarized light selecting unit and the lighting unit, and the fourth polarized light selecting unit preferably reflects the fourth polarized light as well as transmits the third polarized light. Accordingly, display contrast and brightness can be further enhanced.

In the invention, the second polarized light selecting unit preferably transmits the third polarized light and reflects the fourth polarized light. The second polarized light selecting unit is formed to transmit the third polarized light and to reflect the fourth polarized light (reflective polarizer). Consequently, the light not passing through the second polarized light selecting unit can be reflected to return to the backside in the luminous light when the liquid crystal panel is lit from the backside. Because it is possible to convert the polarization state of the reflected light by scattering or reflection to return to the viewing side, a brighter display can be configured.

In the invention, the surface on the viewing side of the first polarized light selecting unit is preferably flat. By flattening the surface on the viewing side of the first polarized light selecting unit, a further excellent mirror surface state in the mirror mode can be realized, and the scattered light other than the specular reflection light of the outside light entering the user's eye can be reduced in the display mode. Therefore, the visibility of the display condition can be enhanced. This characteristic is similarly applicable to the above-mentioned first and second display devices, considering that the polarized light selecting unit is equivalent to the first polarized light selecting unit.

In the invention, a transparent protective film is preferably formed on the surface on the viewing side of the first polarized light selecting unit. Accordingly, the surface on the viewing side of the first polarized light selecting unit can be prevented from being directly scratched or from being adhered with dust and dirt. Desirably in this case, the surface of the protective film is hardened or a transparent hard film is formed thereon. Furthermore, this characteristic is similarly applicable to the first and second display devices, considering that the polarized light selecting unit is equivalent to the first polarized light selecting unit.

In the invention, a lighting unit adapted to emit light to the viewing side is preferably disposed on the backside of the second polarized light selecting unit. Disposing the lighting unit reliably realizes the image display state in the display mode.

In this case, a light reflection component for reflecting outside light to the viewing side in the form of supporting display is preferably not disposed between the first polarized light selecting unit and the lighting unit. Accordingly, the light reflection component is not disposed inside the display to form a transmissive type display. Consequently, the light utilization efficiency of the lighting unit for display can be enhanced. Therefore, the display condition can be reliably visually recognized regardless of the existence of external light reflection by the first polarized light selecting unit. The light reflection component includes a reflective layer or a reflective plate disposed in the pixel area, in which the reflected light is supportable for display, but it does not include a metal shading film, which generates the reflected light not supporting display.

The transmitting polarization axis varying unit is desirably in the state not to emit the first polarized light when the lighting unit is not lit. The mirror mode can be realized in either states that the lighting unit is not lit or the light of display is blocked. However, by setting the lighting unit in the unlit state and the display in the light blocking state, light leakage can be further reduced. Therefore, the mirror surface state in the mirror mode can be formed more excellently.

In the invention, a polarized light selecting area of the first polarized light selecting unit is preferably extended beyond the area overlapping with a transmitting polarization axis varying area of the transmitting polarization axis varying unit. When the polarized light selecting area of first polarized light selecting unit is extended beyond the area overlapping with the transmitting polarization axis varying area of the transmitting polarization axis varying unit, the transmitting polarization axis varying unit (liquid crystal panel) generally requires the structure portion (so-called frame area) extended beyond the transmitting polarization axis varying area (display area). Therefore, the polarized light selecting area of the first polarized light selecting unit can be extended correspondingly to the structure portion without upsizing the display device. Accordingly, the inner space of the display device can be utilized efficiently, and the range (area) to be visibly recognized as a mirror in the mirror mode can be expanded relatively with respect to the outer dimensions of the display device. In addition, this characteristic is similarly. applicable to the first and second display devices, considering that the polarized light selecting unit is equivalent to the first polarized light selecting unit and the display area of the display unit is equivalent to the transmitting polarization axis varying area.

In the invention, the light amount emitted in the normal direction is preferably greatest in the emission angle distribution of luminous light of the lighting unit. By setting the light amount emitted in the normal direction at the greatest, the ratio of the light entering the user's eye for supporting display in the luminous light can be increased in the display mode. Therefore, the influence of external light reflection due to the first polarized light selecting unit can be decreased, and display quality can be enhanced.

In this case, the luminous light of the lighting unit is desirably distributed mainly at an emission angle ranging from zero (0) to forty (40) degrees. In the range of the emission angle, the amount of specular reflection of outside light is relatively small. Therefore, display quality can be enhanced with no influence of external light reflection.

Furthermore, the luminous light of the lighting unit within the range exceeding an emission angle of forty five (45) degrees is desirably one fiftieth ($\frac{1}{50}$) or below of a light amount in the normal direction. The light in the range exceeding an emission angle of forty-five (45) degrees does not support display very well. Thus, unnecessary light is reduced to efficiently realize the display state in the display mode.

In the invention, a color filter is preferably disposed on the backside of the first polarized light selecting unit. By disposing the color filter on the backside of the first polarized light selecting unit, color display in the display mode can be realized.

In the invention, a retarder is preferably disposed between the first polarized light selecting unit and the transmitting polarization axis varying unit. The retarder can be used as an optical compensator for reducing coloring, or a viewing angle compensator for improving the viewing angle property.

In the invention, it is preferable that a transparent member is disposed on the viewing side of the first polarized light selecting unit, and the first polarized light selecting unit is directly or indirectly closely contacted with the transparent member. The first polarized light selecting unit is closely contacted with the transparent member, which allows the surface on the viewing side of the first polarized light selecting unit to be protected and the first polarized light selecting unit can reliably be positioned and held. This characteristic is similarly applicable to the first and second display devices, considering that the polarized light selecting unit is equivalent to the first polarized light selecting unit.

In this case, the first polarized light selecting unit is desirably bonded to the transparent member via a transparent substance.

As the form that the first polarized light selecting unit is fixed to the transparent member, two cases are named: the case where only the first polarized light selecting unit is fixed to the transparent member, and the case where the display unit or the transmitting polarization axis varying unit is fixed along with the first polarized light selecting unit. In the latter case, it is preferable to fix the transparent member via a transparent bonding layer having elasticity. Accordingly, the influence of an external stress (such as shock) on the display unit and the transmitting polarization axis varying unit can be relaxed, and the shock-resistance Of the display device can be enhanced. In addition, this characteristic is similarly applicable to the first and second display devices, considering that the polarized light selecting unit is equivalent to the first polarized light selecting unit.

Furthermore, the surface of the transparent member on the first polarized light selecting unit is desirably flat. Accordingly, the surface on the backside of the transparent member is made flat. Therefore, the surface on the viewing side of the first polarized light selecting unit closely contacted with the surface can be formed flat. Particularly, the first polarized light selecting unit is available as a sheet material having flexibility. Thus, the surface on the backside of the transparent member is formed flat and the first polarized light selecting unit is closely contacted or bonded to the surface, which allows the first polarized light selecting unit to be kept flat. Therefore, the mirror surface state in the mirror mode can be high quality. Furthermore, this characteristic is similarly applicable to the first and second display devices, considering that the polarized light selecting unit is equivalent to the first polarized light selecting unit.

Moreover, the surface on the viewing side of the transparent member is desirably a curved surface. Accordingly, the transparent member can be used as an optical lens, which allows the display screen to be visibly recognized in a properly enlarged or reduced state. This characteristic is similarly applicable to the first and second display devices, considering that the polarized light selecting unit is made equivalent to the first polarized light selecting unit.

Next, an electronic device of the invention is provided with the display device according to any one of the above. As described above, the display device is configured to be switchable between the display mode and the mirror mode by only disposing the polarized light selecting unit on the viewing side of the display unit. Therefore, degraded display quality can be avoided, and also the electronic device can be reduced in size and weight. Accordingly, the electronic device is preferably configured as portable electronic devices such as a mobile phone and a personal information terminal.

In addition, another electronic device of the invention has the display device according to any one of the above and a display drive unit adapted to drive the transmitting polarization axis varying unit. The display device is switchable, as described above, between the display mode and the mirror mode without disposing another transmitting polarization axis varying unit on the viewing side. Therefore, display quality in the display mode can be improved. Particularly, the display device can be formed to be low-profile and light-weight, and thus the electronic device is preferably configured as portable electronic devices such as a mobile phone and a personal information terminal.

Furthermore, another electronic device of the invention has:
a display device with a lighting unit;
a display drive unit adapted to drive the transmitting polarization axis varying unit; and
a lighting control unit adapted to control the lighting unit. Particularly, by configuring the display drive unit and the lighting control unit to operate together, it is possible to set the lighting unit in the unlit state and at the same time, it is possible to set the light blocking state by controlling the transmitting polarization axis varying unit. Accordingly, light leakage can be reduced in the mirror mode, and the mirror surface state can be configured in a further excellent form.

Moreover, still another electronic device of the invention is characterized by having a display unit adapted to allow light emission,
wherein the display unit has a polarized light selecting unit adapted to transmit a first polarized light and to reflect a second polarized light having a polarization axis crossing a polarization axis of the first polarized light on a viewing side thereof, and
a transmissive display mode, in which the first polarized light is emitted from the polarized light selecting unit to the viewing side of the display unit to allow the first polarized light to be observed on the viewing side, and a mirror mode, in which the first polarized light is not emitted from the polarized light selecting unit to the viewing side of the display unit, and the polarized light selecting unit is used as a mirror on the viewing side of the display unit, are switchable.

Preferably, the electronic device further has an input part for allowing an operation of the display device or performing data input to the display in the display device,
wherein the input part is preferably manually operated to allow switching between the transmissive display mode and the mirror mode.

Manually operating the input part of the electronic device allows switching between the transmissive display mode and the mirror mode. Therefore, any one of the transmissive display mode and the mirror mode can be implemented at any time at the user's wish. Here, as the input part, various manual operation buttons such as a data input key button, various operation switches such as a power switch, and operation members such as a operation dial can be named.

BRIEF DESCRIPTION OF THE DRAWINGS

FIG. 7 is a schematic diagram illustrating the configuration of the display device of the seventh embodiment in the invention;

DETAILED DESCRIPTION

Next, embodiments of the display device and the electronic device in the invention will be described in detail with reference to the accompanying drawings.

First Embodiment

Figure 1:
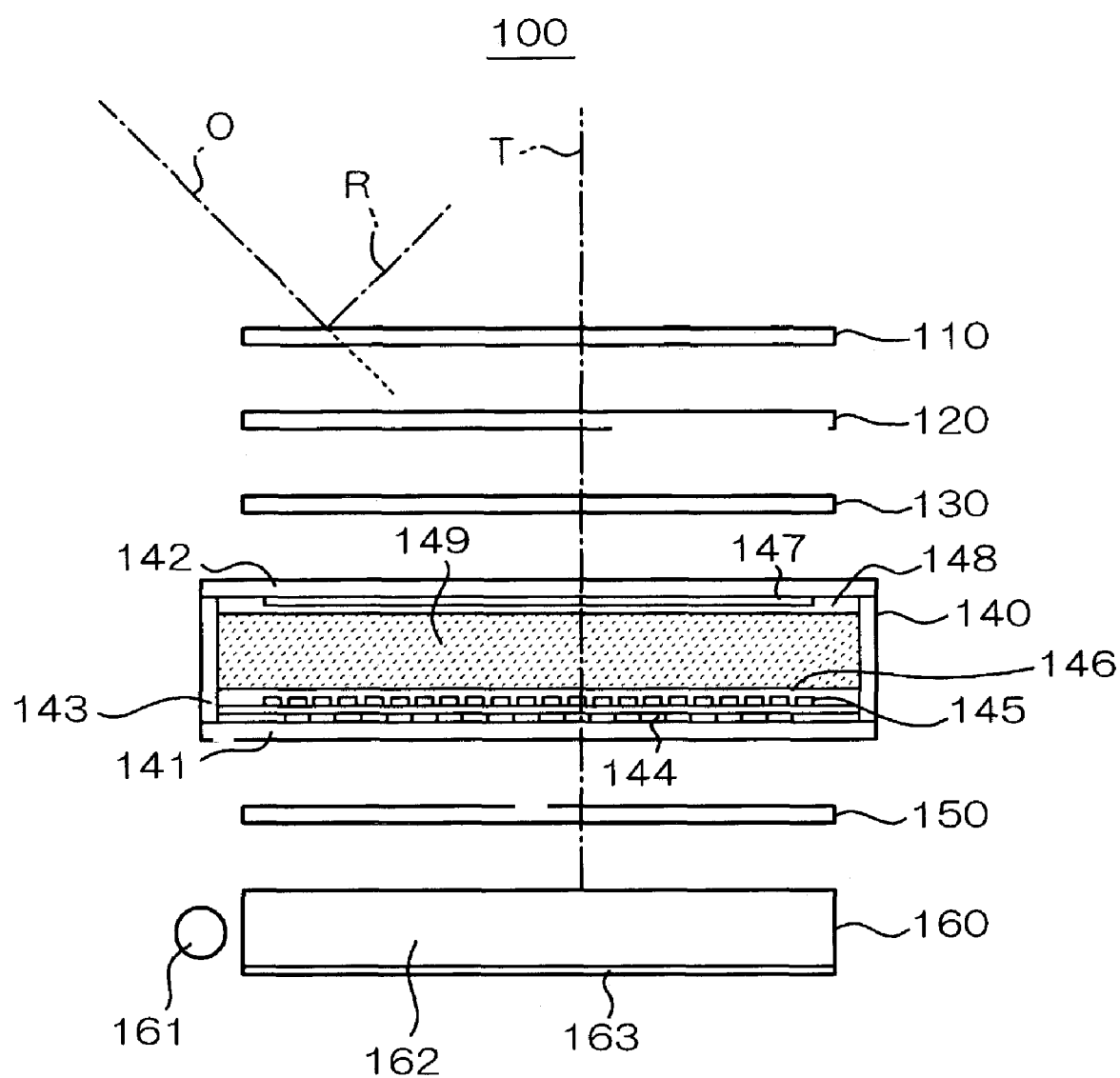
FIG. 1 is a schematic diagram illustrating the configuration of the display device of the first embodiment in the invention.

First, the configuration of a first embodiment in the invention will be described with reference to FIG. 1. In a display device 100 shown in FIG. 1, a reflective polarizer 110, a polarizer 120, a retarder 130, a liquid crystal panel 140, a polarizer 150, and a backlight 160 are sequentially disposed from the viewing side (the upper side in the drawing).

The reflective polarizer 110 transmits a polarized light component having a vibration plane parallel to the transmitting polarization axis, and reflects a polarized light component having a vibration plane parallel to the direction crossing (preferably orthogonal) the transmitting polarization axis. As the reflective polarizer, a multilayer product having birefringent polymer films different from each other laminated, that is the multilayer product described in PCT/A/WO95/27919, or a product having quarter (¼) wavelength plates disposed on the front and back sides of a cholestric liquid crystals can be used. As the multilayer product, there is a multilayer film, whose trade name is DBEF, provided by Minnesota Mining & Manufacturing Co.

As the polarizers 120 and 150, a publicly-known absorption type polarized is used, which transmits the polarized light component having the vibration plane parellel to the transmitting polarization axis and absorbs the polarized light component having the vibration plane parallel to the direction crossing the transmitting polarization axis (preferably orthogonal). The polarizer 120 and the polarizer 150 are arranged in an appropriate configuration of the liquid crystal device (for example, they are arranged in the crossed Nicols when the liquid crystal panel 140 is a TN liquid crystal cell having a twisted angle of ninety (90) degrees).

The polarizer 120 is disposed so that the transmitting polarization axis is matched with the transmitting polarization axis of the reflective polarizer 110. The crossed axes angle between the transmitting polarization axis of the reflective polarizer 110 and the transmitting polarization axis of the polarizer 120 is not necessarily zero degrees. However, display contrast is reduced as the crossed axes angle becomes greater. Therefore, the crossed axes angle is desirably fifteen (15) degrees or below, particularly five (5) degrees or below.

Optically, the polarizer 120 can be omitted. However, the polarized light selectivity of the reflective polarizer 110 (the ratio of the polarized light component having the vibration plane parallel to the transmitting polarization axis in the transmitted light with respect to the incident natural light) is generally lower than that of the absorption type polarizer. Thus, when the polarizer 120 is omitted, a contrast in the display mode is reduced. Conversely, when the polarization degree of the reflective polarizer (the polarized light selecting unit or first polarized light selecting unit) does not cause a problem, the absorption type polarizer (the third polarized light selecting unit) included in the display unit can be omitted. In this case, the function is served by the reflective polarizer (the polarized light selecting unit or first polarized light selecting unit). In addition, this is similarly applicable to all the embodiments including the absorption type polarizer described below (the third polarized light selecting unit).

Furthermore, as the polarizer 150, a reflective polarizer similarly configured to the reflective polarizer 110 can be used, instead of the absorption type polarizer.

The retarder 130 functions as an optical compensator for reducing display coloring, particularly, when the liquid crystal panel 140 is the STN mode. It can also be configured to function as a viewing angle compensator for improving the viewing angle dependency of the liquid crystal display. Display itself is feasible without disposing the retarder 130.

The liquid crystal panel 140 includes two substrates 141 and 142 formed of a transparent substrate such as glass or plastic. Over the inner surface of the substrate 141, a color filter 144 is formed. In the color filter 144, a plurality of colored layers, for example, red, green and blue, are arranged in a predetermined array pattern (such as a stripe array, a delta array, and a diagonal mosaic array). These colored layers are preferably covered with a transparent protective film.

On the color filter 144, a transparent electrode 145 configured of ITO or the like is formed corresponding to the array of the colored layer. Over the transparent electrode 145, an alignment layer 146 configured of polyimide resin is formed. In addition, over the inner surface of the substrate 142, a transparent electrode 147 and an alignment layer 148 similar to the above are formed.

In the panel structure, it is acceptable that a pair of substrates forming the panel structure is any of those using glass as the material (including silica), those using resins (plastic), or those using glass for one substrate and a resin for the other substrate. Particularly, by using a resin material for the material of the substrates, the device can be formed low-profile and can enhance the shock-resistance as well.

The substrates 141 and 142 are bonded by a sealing material 143, and liquid crystal 149 are disposed therein. As the liquid crystal mode of the liquid crystal panel 140 thus configured, the TN (Twisted Nematic) mode, the STN (Super Twisted Nematic) mode, and the ECB (Electrically Controlled Birefringence) mode are preferable. In all the display methods according to these liquid crystal modes, the liquid crystal panel is configured to realize the display condition with the use of the polarizer. Thus, high display quality can be obtained at a relatively low drive voltage, which is particularly desirable when it is mounted in a portable electronic device.

Furthermore, as the drive mode of the liquid crystal panel 140, any of the active drive mode including the active matrix drive using an active device such as a TFT (Thin Film Transistor) and a TFD (Thin Film Diode), or the passive drive mode including the simple drive without using the active device or the multiplex drive, is acceptable.

Moreover, in the embodiment, the liquid crystal panel 140 is a transmissive type panel with no reflective layer or reflector inside or outside. More specifically, the embodiment does not have a light reflection component (reflecting surface) for reflecting the outside light to the viewing side in the pixel, which is different from a reflective type panel or a semi-transmissive reflective type panel. The above mentioned light reflection component means a component having a light reflecting function inside the area for supporting display (in the pixel), which is a concept not containing a metal light blocking layer that does not support display. Of course, the light reflection component not supporting display such as a metal shading film desirably does not exist.

It is acceptable to use a backlight 160 that can light the liquid crystal panel 140 from behind with nearly uniform illuminance. For example, an edge emitting type backlight including a light guide plate and a light source disposed in the end face part of the light guide plate, and a back emitting type backlight including a light guide plate and a light source disposed on the backside of the light guide plate, are named. In the example shown in the drawing, a light source 161 and a light guide plate 162 having the light source 161 disposed adjacent to its end face are provided. Preferably, a light reflection component, such as a metal layer or a printed layer for nearly uniformly guiding the light incident from the light source 161 to the liquid crystal panel 140 side, or a scattering component 163, is disposed in the light guide plate 162.

In the embodiment, the polarizer 120, the retarder 130, the liquid crystal panel 140, the polarizer 150 and the backlight 160 configure the display unit. Basically, this display unit emits only the first polarized light to the reflective polarizer 110. In the display mode, the first polarized light is controlled to be emitted or not to be emitted, or an amount of the first polarized light to be emitted is controlled on each of a plurality of pixels formed in the liquid crystal panel 140. Consequently, a predetermined display image is formed.

In the display device 100 of the embodiment, the backlight 160 is set in the lit state and a voltage applied between the transparent electrodes 145 and 147 of the liquid crystal panel 140 is controlled. Thus, predetermined display is performed in a liquid crystal display formed of the polarizer 120, the retarder 130, the liquid crystal panel 140 and the polarizer 150. Therefore, the display mode that the light emitted from the polarizer 120 passes through the reflective polarizer to be visibly recognized can be realized.

In addition, by setting the liquid crystal display in the off (light blocking) state, that is, setting all the pixels of the liquid crystal display in the light blocking state, or setting the backlight 160 in the unlit state, the mirror mode that a display plane is visibly recognized as a mirror can be realized.

In the display device 100, an outside light "O" enters from the viewing side in the normal service conditions. However, a portion of the outside light "O", that is the polarized light component having the vibration plane parallel to the transmitting polarization axis of the reflective polarizer 110 passes through the reflective polarizer 110, and is guided inside. The polarized light component having the vibration plane orthogonal to the transmitting polarization axis of the reflective polarizer 110 is reflected by the reflective polarizer 110, and is returned to the viewing side as a reflected light "R." On the other hand, the luminous light radiated from the backlight 160 passes through the polarizer 150 to be a linear polarized light. Its polarization state is converted in the liquid crystal panel 140, or the light passes as it is without being converted. Only the polarized light component having the vibration plane parallel to the transmitting polarization axis of the polarizer 120 is emitted from the polarizer 120. This polarized light component also passes through the reflective polarizer 110 as it is, and it is visibly recognized on the viewing side. Accordingly, when the liquid crystal display is in the state of displaying a particular image, the light passes in the transparent area formed according to the display image, and it passes through the reflective polarizer 110 to be visibly recognized as a transmitted light "T."

In the display mode, the particular display image is visually recognized by the transmitted light "T," but the reflected light "R" due to the outside light "O" exists at this time. Thus, the visibility of the display image seems to be reduced. However, the outside light "O" usually enters the display device 100 from the direction different from the user's viewing direction. Therefore, the light amount of the reflected light "R" (the specular reflection light), generated in the reflective polarizer 110 and directly entering the user's eye, is small, and most of it is reflected in the direction different from the user's eye as shown in the drawing. Accordingly, when the transmitted light "T" is intense enough, a reduction in the visibility of the display image due to the reflected light "R" can be limited.

In the mirror mode, the liquid crystal display is in the light blocking state, or the backlight 160 is in the unlit state, thus the transmitted light "T". is almost eliminated. Therefore, the reflected light R is felt more intense correspondingly, and the entire display plane is visibly recognized as a mirror.

Furthermore, when the mirror mode is configured, it is preferable to set the backlight 160 in the unlit state as well as to set the liquid crystal display in the light blocking state. When this is done, light leakage can be prevented nearly perfectly. Accordingly, the transmitted light "T" can be further reduced, and a more excellent mirror surface state can be obtained.

In the embodiment, the reflective polarizer 110 is disposed on the viewing side. Thus, a significantly excellent mirror surface state can be obtained. In addition to this, another liquid crystal panel does not exist on the viewing side of the liquid crystal display, and therefore the influence on the display image can be reduced as well. Accordingly, display quality can be kept excellently as well. Moreover, the embodiment does not have the double layer panel structure. Therefore, the display device can be formed to be low-profile and light-weight can be achieved as well.

Moreover, the surface on the viewing side of the reflective polarizer 110 is preferably flat. When the surface on the viewing side of the reflective polarizer 110 is flat, the mirror surface state can be configured more excellently, and quality as a mirror can be enhanced. Thus the situation that the specular reflection light of the outside light "O" having high intensity tends to enter the user's eye in the display mode will not occur. (Such a situation may occur when the surface is not flat.) Therefore, the visibility of the display image can be prevented from being reduced. Preferably, the surface is optically flat (an optical flat), particularly, in the visible light area.

Second Embodiment

Figure 2:
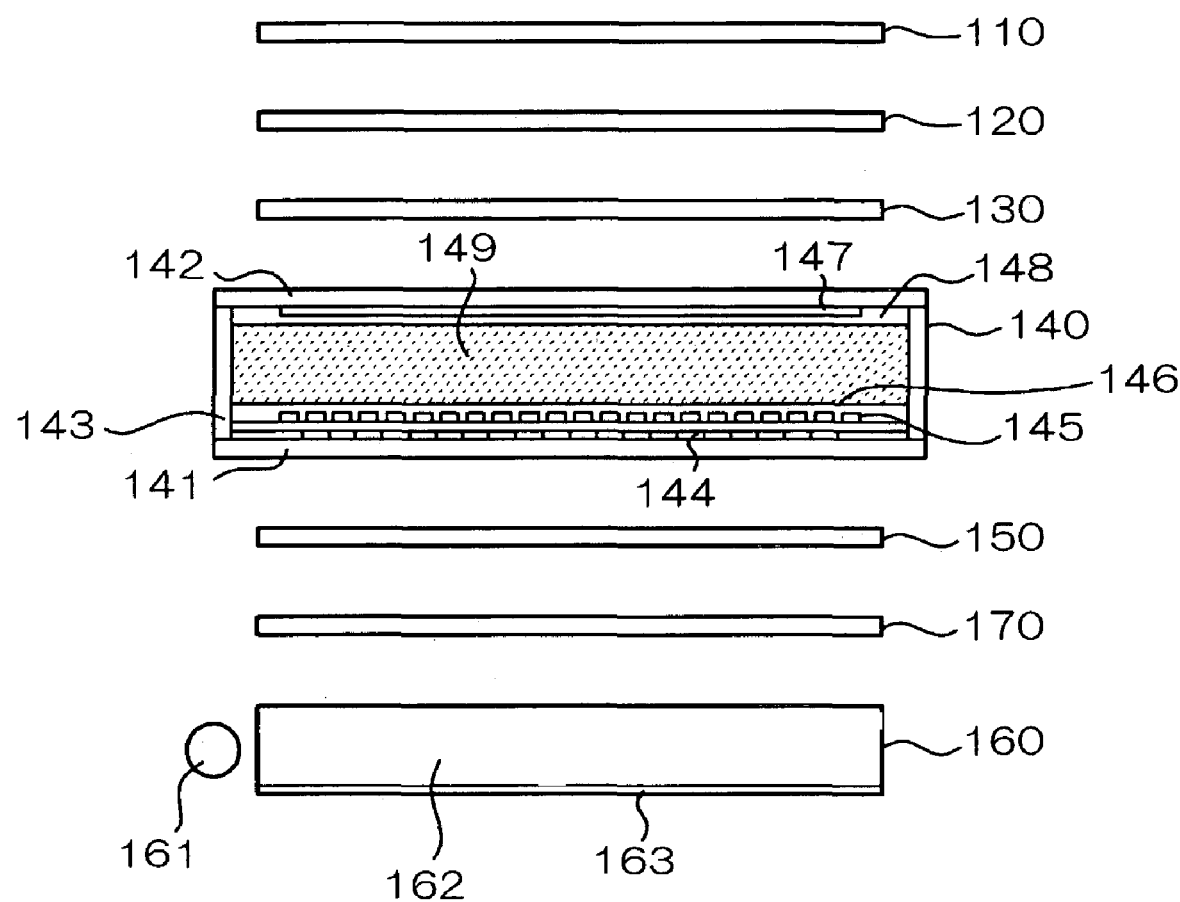
FIG. 2 is a schematic diagram illustrating the configuration of the display device of the second embodiment in the invention.

Next, a second embodiment of the invention will be described with reference to FIG. 2. In this embodiment, the same components as the first embodiment are designated the same numerals and signs, and the description for them is omitted. In the embodiment, a reflective polarizer 110, a polarizer 120, a retarder 130, a liquid crystal panel 140, a polarizer 150, and a backlight 160 are sequentially disposed from the viewing side. The different point from the first embodiment is in that a reflective polarizer 170 is further disposed between the polarizer 150 and the backlight 160. This reflective polarizer 170 is the same as the reflective polarizer 110, but its transmitting polarization axis is disposed in the attitude matched with the transmitting polarization axis of the polarizer 150.

In the embodiment, the reflective polarizer 170 reflects the polarized light component of the luminous light emitted from the backlight 160, which does not pass through the polarizer 150, to the backlight 160 side. The reflected polarized light component enters the light guide plate 162, and the polarization state of at least a part of the light is changed and reflected to the viewing side again. A part thereof passes through the reflective polarizer 170 and the polarizer 150 to be a part of the transmitted light "T." Accordingly, a part of light not utilized for display in the first embodiment can be reused. Thus, the brightness of the display image can be enhanced, and display quality in the display mode can be enhanced.

In the embodiment, it is also possible that the polarizer 150 is omitted to allow display of the liquid crystal display only by the reflective polarizer 170. However, in this case, the polarized light selectivity of the reflective polarizer 170 (the transmittance of the polarized light component having the vibration plane parallel to the transmitting polarization axis, or the reflectance of the polarized light component having the vibration plane orthogonal to the transmitting polarization axis) is lower than that of the absorption type polarizer. Thus, display contrast is reduced, or display brightness is decreased. In addition, at least a part of the light in the outside light "O" having transmitted through the reflective polarizer 110 on the viewing side (for example, the light to enter a pixel in the light blocking state) is likely to be reflected on the reflective polarizer 170. And, it can be considered that the reflection causes the visibility of the display image to be reduced.

Third Embodiment

Figure 3:
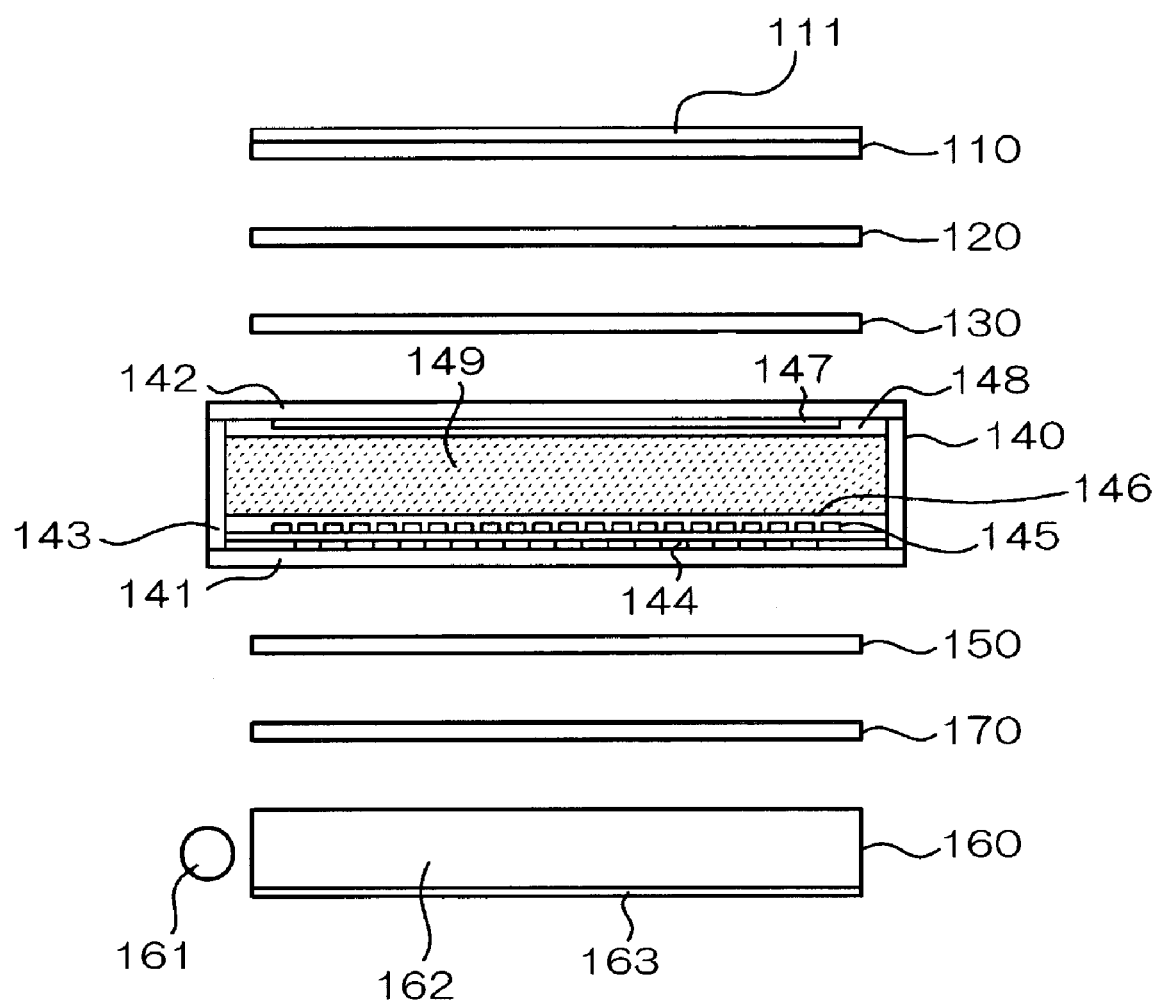
FIG. 3 is a schematic diagram illustrating the configuration of the display device of the third embodiment in the invention.

Next, a third embodiment of the invention will be described with reference to FIG. 3. In this embodiment, the same components as the second embodiment are designated the same numerals and signs, and the description for them is omitted. In the embodiment, a reflective polarizer 110, a polarizer. 120, a retarder 130, a liquid crystal panel 140, a polarizer 150, a reflective polarizer 170, and a backlight 160 are disposed sequentially from the viewing side. A transparent protective film 111 is further formed on the surface on the viewing side of the reflective polarizer 110.

The protective film 11 can be formed of a thin film such as acryl resin, $SiO_2$ $TiO_2$. Particularly, it is preferably a hard protective film having a hardness equal to or greater than inorganic glass such as $SiO_2$ and $TiO_2$. It is acceptable that the protective film is a product bonded with a film or sheet formed of a transparent material, or a product directly deposited on the surface of the reflective polarizer 110 by coating, evaporation, and sputtering.

In the embodiment, the transparent protective film 111 is formed on the surface on the viewing side of the reflective polarizer 110. Therefore, the surface of the reflective polarizer 110 can be prevented from being scratched, or a foreign matter can be prevented from adhering thereto. Accordingly, the mirror surface state can be configured excellently.

Fourth Embodiment

Figure 4:
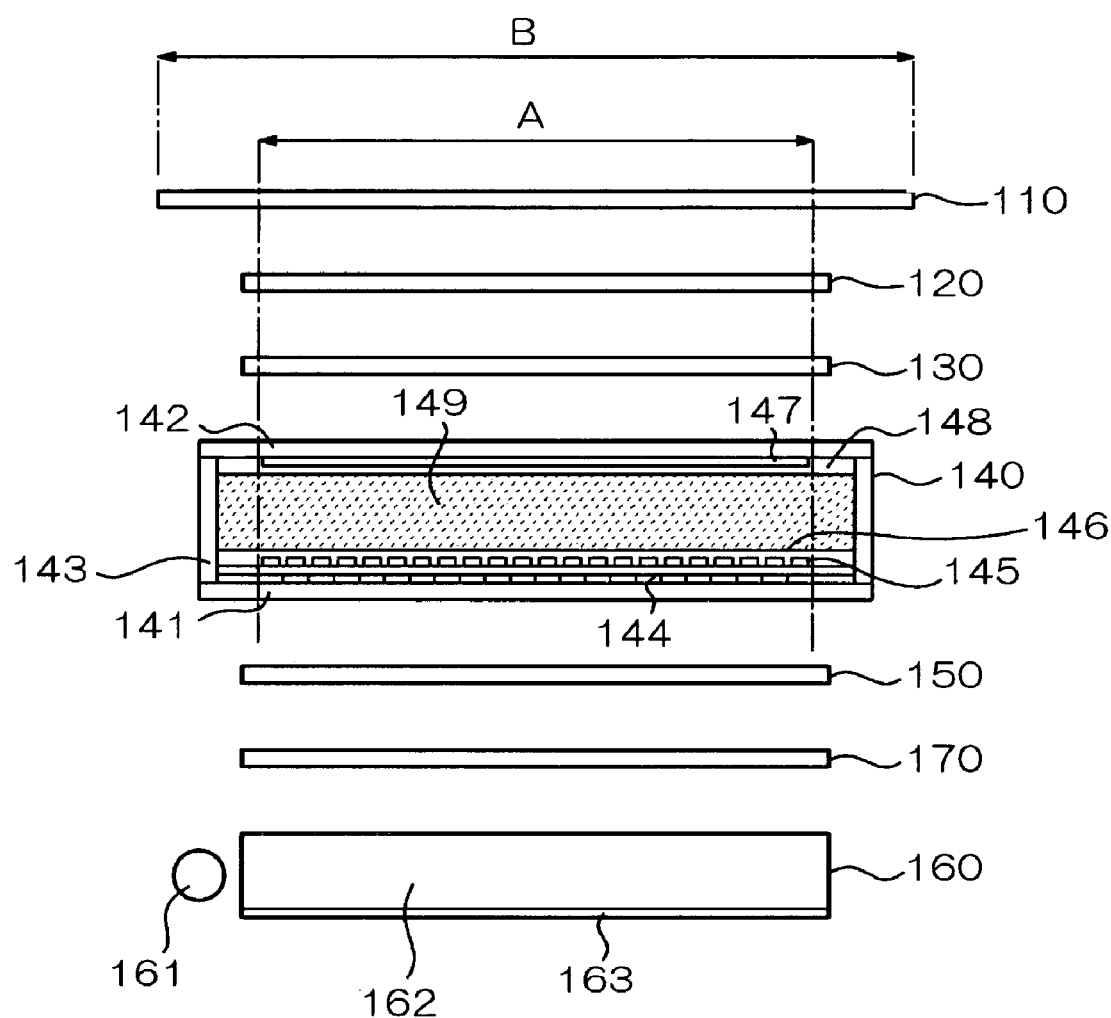
FIG. 4 is a schematic diagram illustrating the configuration of the display device of the fourth embodiment in the invention.

Next, a fourth embodiment of the invention will be described with reference to FIG. 4. In this embodiment, the same components as the second embodiment are designated the same numerals and signs, and the description for them is omitted. In the embodiment, a reflective polarizer 110, a polarizer 120, a retarder 130, a liquid crystal panel 140, a polarizer 150, a reflective polarizer 170, and a backlight 160 are disposed sequentially from the viewing side.

In the embodiment, the mirror area (polarized light selecting area) "B" occupied by the reflective polarizer 170 is configured to cover an area wider than the display area "A" (that is, the display area of the liquid crystal display formed of the polarizer 120, the liquid crystal panel 140 and the polarizer 150) of the display unit. More specifically, the mirror area "B" is configured to extend beyond the area two-dimensionally overlapping with the display area "A" for further extension.

For the liquid crystal panel 140, it is needed to provide the area bonded with a sealing material 143 and the area formed with input terminals (not shown in the drawing) on the outside the area around the display area "A." Consequently, a frame-like portion (so-called frame area) exists to some extent around the display area "A" as the display device 100. However, by covering this portion with the reflective polarizer 110, a wider mirror area can be formed without upsizing the display device.

In addition, the configuration of the fourth embodiment is applicable to any of the first embodiment to the third embodiment.

Fifth Embodiment

Figure 5:
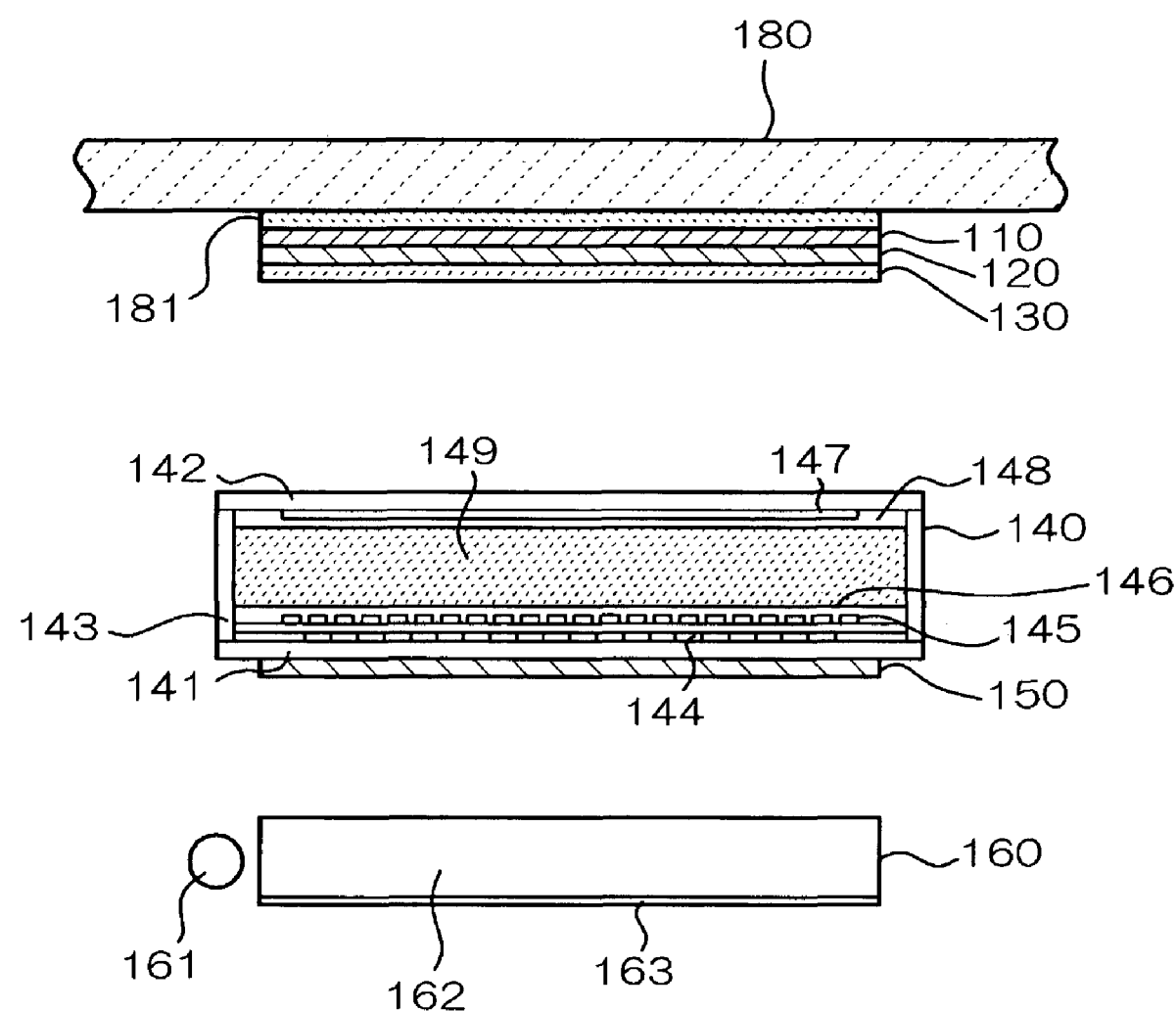
FIG. 5 is a schematic diagram illustrating the configuration of the display device of the fifth embodiment in the invention.

Next, a more specific configuration of the first embodiment will be described as a fifth embodiment with reference to FIG. 5. In the embodiment, as shown in FIG. 5, a transparent plate 180 is disposed on the viewing side of a reflective polarizer 110. Then, the reflective polarizer 110 is closely contacted with the transparent plate 180. As the transparent plate 180, for example, a display window member (a display window exposed to outside) of the display part of an electronic device (described later) is named, for example. The transparent plate 180 can be formed of a transparent material such as acryl resin or glass. For example, the reflective polarizer 110 is bonded to the transparent plate 180 with a transparent adhesive 181. The surface on the backside of the transparent plate 180 (the under side in the drawing) is formed to be flat. Accordingly, the surface on the viewing side of the closely contacted reflective polarizer 110 is formed to be flat.

In the embodiment, a polarizer 120 and a retarder 130 are also directly or indirectly fixed to the transparent plate 180 along with the reflective polarizer 110. For example, the polarizer 120 is bonded to the reflective polarizer 110, and furthermore, the retarder 130 is bonded to the polarizer 120.

In the embodiment, a liquid crystal panel 140 and a backlight 160 are not fixed to the transparent plate 180 or to the polarizer 120 or the retarder 130 fixed thereto. In this case, the liquid crystal panel 140 can be fixed inside the device separately (for example, fixed on a circuit board) from the transparent plate 180, and a gap can be provided between the liquid crystal panel 140 and the multilayer structure fixed to the transparent plate 180. When this is done, the liquid crystal panel 140 is disposed inside the device separately from the multilayer structure including the reflective polarizer 110. Thus, product yields can be improved in the fabrication processes. Of course, the liquid crystal panel 140 and a polarizer 150 can also be fixed and integrated to the transparent plate 1 80.

Furthermore, the polarizer 150 is preferably bonded over the outer face of a substrate 141 on the backside of the liquid crystal panel 140. Moreover, the liquid crystal panel 140 and the backlight 160 are disposed with a gap in the drawing, but it is acceptable that they are closely contacted or bonded to each other. More specifically, it is acceptable that the polarizer 150 is closely contacted or bonded to the viewing side of a light guide plate 162.

The fixing structure to the transparent plate 180 can be applicable not only to the first embodiment but also to any of the second embodiment to the fourth embodiment in completely the same manner.

Sixth Embodiment

Figure 6:
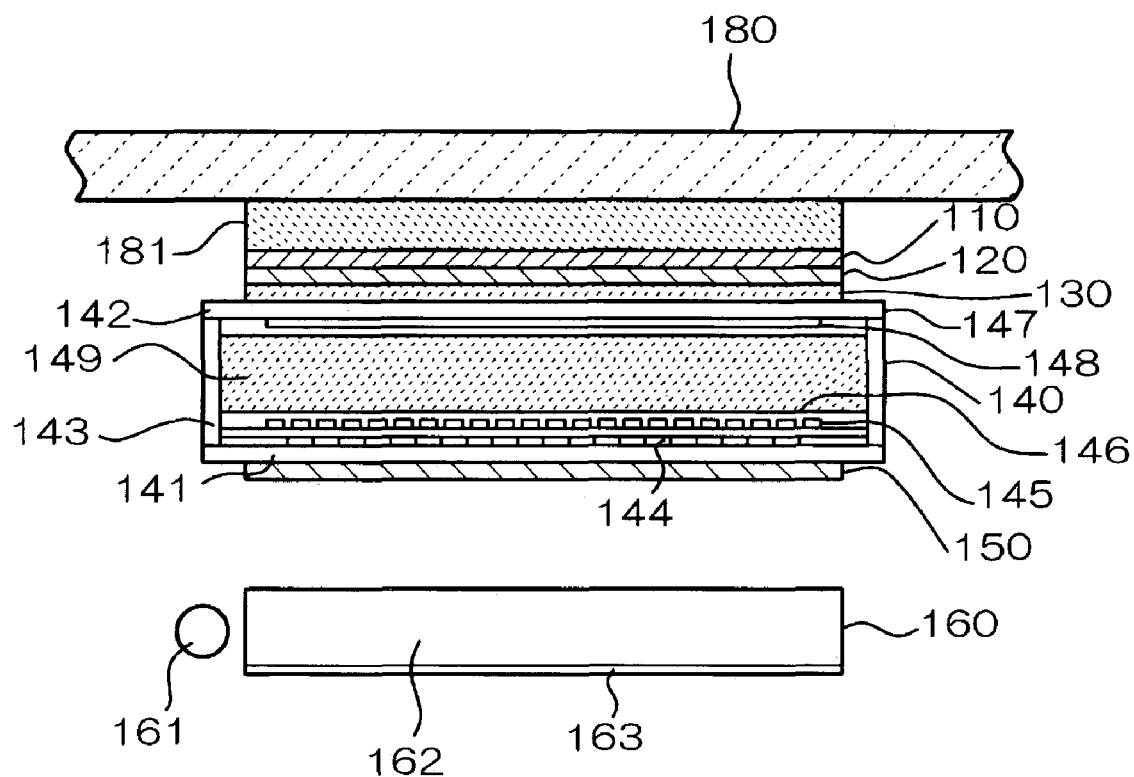
FIG. 6 is a schematic diagram illustrating the configuration of the display device of the sixth embodiment in the invention.

Next, a sixth embodiment of the invention will be described with reference to FIG. 6. In this embodiment, a transparent plate 180 is disposed similar to that in the fifth embodiment. Then, a reflective polarizer 110 is bonded to the transparent plate 180 by a transparent adhesive 181 such as acryl resin. The surface on the backside of the transparent plate 180 is formed to be flat, and the reflective polarizer 110 fixed to the surface exerts the same effect and advantage as the fifth embodiment. In this embodiment, a polarizer 120, a retarder 130, a liquid crystal panel 140 and a polarizer 150 are fixed to the transparent plate 180 along with the reflective polarizer 110.

In the embodiment, the transparent adhesive 181 is preferably formed to have a thickness of 0.3 mm or greater. Accordingly, the fixing structure of the transparent plate 180 to the liquid crystal panel 140 is allowed to have sufficient elasticity when the transparent plate 180 is fixed to a case of an electronic device. Therefore, the liquid crystal panel 140 can be protected against impact or the like.

In addition, the configuration of the embodiment is applicable to any of the first to fourth embodiments.

Seventh Embodiment

Next, a seventh embodiment of the invention will be described with reference to FIG. 7. This embodiment depicts the configuration of the second embodiment more specifically. In the embodiment, a reflective polarizer 110 is closely contacted with a transparent plate 190. The reflective polarizer 110 is fixed to the transparent plate 190. Particularly, the reflective polarizer 110 is preferably bonded to the transparent plate 190 by a transparent adhesive 191 the same as that in the above described embodiments. The transparent plate 190 can be formed of the same material as the transparent plate 180 shown in the first embodiment. The surface on the backside of the transparent plate 190 is formed to be flat, and the reflective polarizer 110 fixed to this surface exerts the same effect and advantage as the first embodiment. In addition, a polarizer 120 and a retarder 130 are closely contacted with the reflective polarizer 110. They are also preferably bonded to each other by an adhesive layer or an adhesive.

A polarizer 150 and a reflective polarizer 170 are fixed to a liquid crystal panel 140. The polarizer 150 and the reflective polarizer 170 are preferably bonded to each other by an adhesive layer or an adhesive.

In the transparent plate 190, at least a portion of the surface corresponding to the display area is a curved surface 190A in the surface on the viewing side. Accordingly, the transparent plate 190 has the same function as an optical lens, which allows the display screen formed of a display device 100 to be visibly recognized in an enlarged or reduced state. For example, the curved surface 190A is formed into a convex curve as shown in the drawing, and thus the display screen can be visibly recognized in the enlarged state. Therefore, letters can be enlarged to enhance visibility when the display area of the display device is small.

Also in this case, not only the reflective polarizer 110, but also the polarized 120 and the retarder 130 can be fixed to the transparent plate 190. Moreover, the liquid crystal panel 140 and the polarizer 150 (the reflective polarizer 170 as well) can also be fixed to the transparent plate 190 as integrated parts similar to the sixth embodiment. The configuration including the transparent plate 190 can of course be applicable first to fifth embodiments and the other embodiments shown below.

Eighth Embodiment

Figure 8:
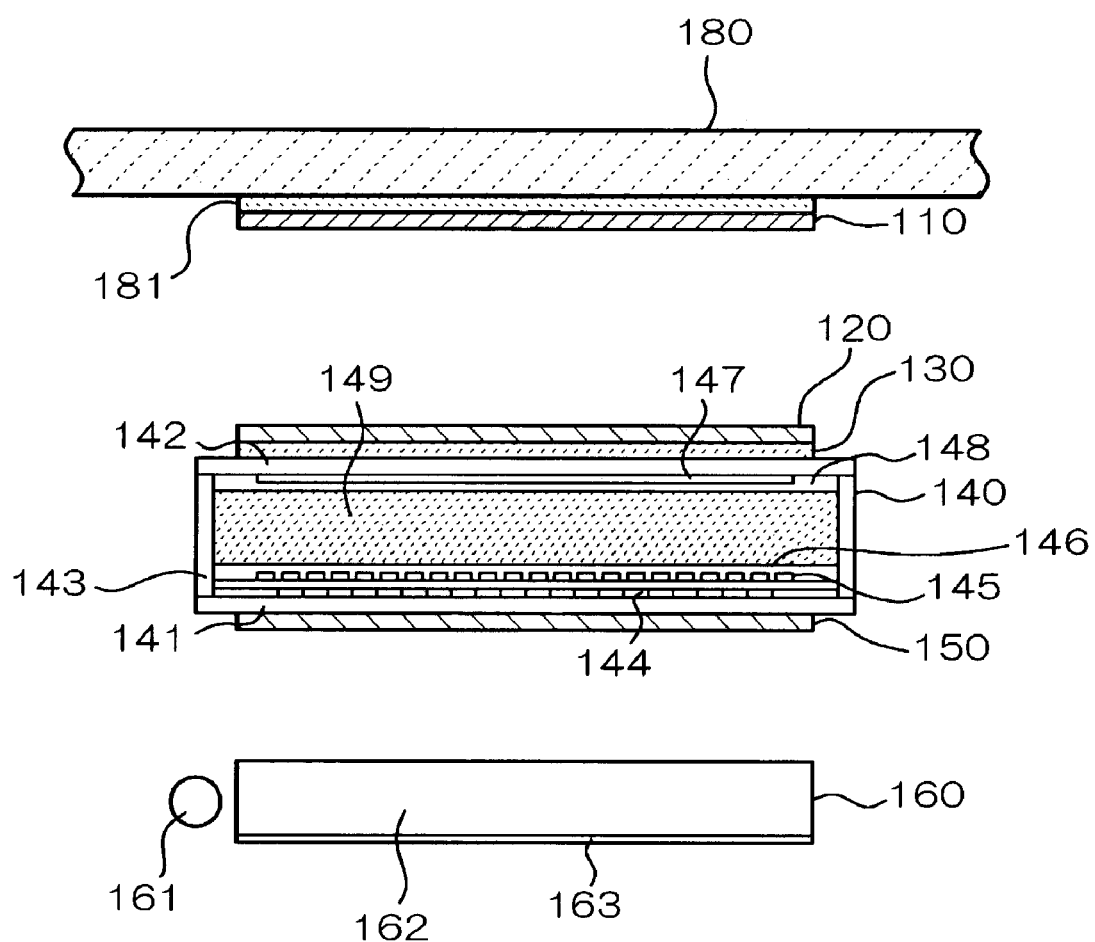
FIG. 8 is a schematic diagram illustrating the configuration of the display device of the eighth embodiment in the invention.

Next, an eighth embodiment of the invention will be described with reference to FIG. 8. In this embodiment, a reflective polarizer 110 is closely contacted with the backside of a transparent plate 180 the same as that in the fifth embodiment. The reflective polarizer 110 is fixed to the transparent plate 180 by a transparent adhesive 181 similar to that in the fifth embodiment. In the embodiment, only the reflective polarizer 110 is fixed to the transparent plate 180. A polarizer 120, a retarder 130, a liquid crystal panel 140, a polarizer 150 and a backlight 160, which configure a display unit, are disposed with a gap relative to the transparent plate 180 and the reflective polarizer 110.

In this embodiment, the display unit is fixed inside similar to typical electronic devices, and the reflective polarizer 110 is fixed to the inner surface of the transparent plate 180 disposed on the viewing side of the display unit. Accordingly, it is configured completely the same as the electronic device incorporating a conventional display unit, and the reflective polarizer 110 is only fixed to the inner surface of the transparent plate 180. Thus, this embodiment of the invention can be realized. Therefore, it can be fabricated significantly simply at low costs.

Ninth Embodiment

Figure 9:
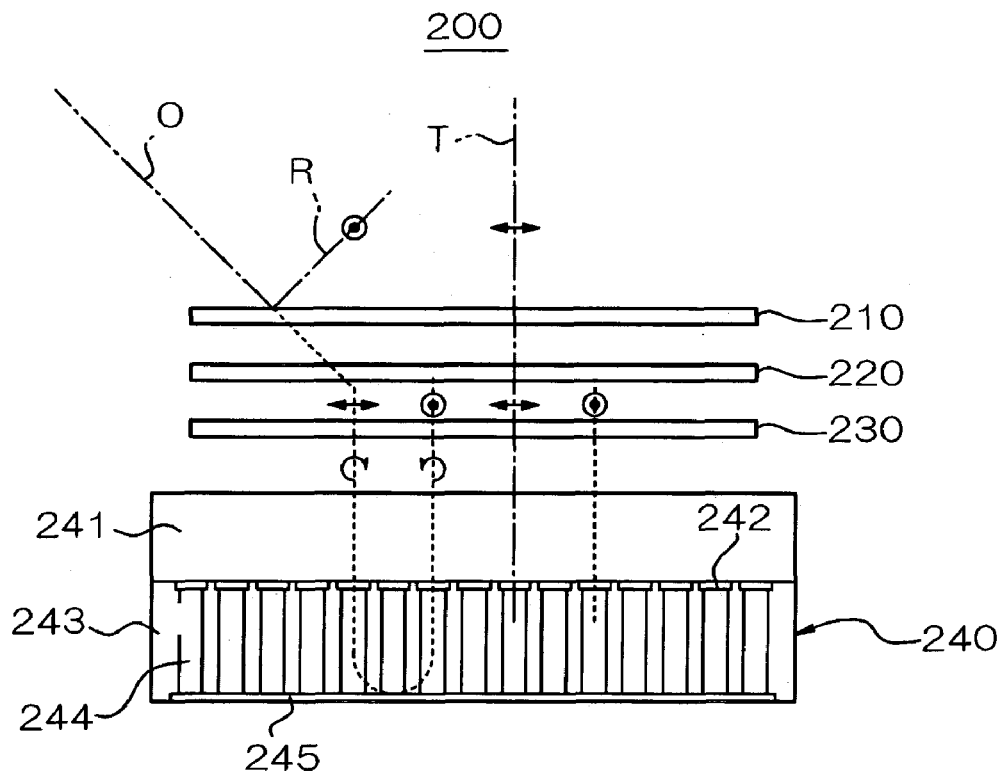
FIG. 9 is a schematic diagram illustrating the configuration of the display device of the ninth embodiment in the invention.

Next, a ninth embodiment of the invention will be described with reference to FIGS. 9 and 10. In a display device 200 in this embodiment, a reflective polarizer 210, a polarizer 220 and a retarder 230 are sequentially disposed from the viewing side, as shown in FIG. 9. An electroluminescent panel (hereafter, it is simply called EL panel) 240, which is an electro-optical device equivalent to the display unit is disposed behind them. The reflective polarizer 210 and the polarizer 220 are completely the same as those in the previous embodiments. In the embodiment, the retarder 230 is a quarter (¼) wavelength plate.

In the EL panel 240, an electrode 242 configured of a transparent conductor such as ITO is formed on a substrate 241, and a light emitting element 244 is disposed on the electrode 242. Furthermore, a counter electrode 245 is formed on the light emitting element 244.

The counter electrode 245 is preferably configured as a reflecting electrode formed of aluminium or other metals. In the example shown in the drawing, an example is depicted in which the sash-like electrode 242 arranged as a plurality side by side in a stripe shape and the sash-like counter electrode 245 similarly arranged side by side in the stripe shape are disposed orthogonal to each other (the electrode structure corresponding to the passive matrix drive system). However, the electrode structure is arbitrary, and it is acceptable to have a different electrode structure if required for display, such as the electrode structure corresponding to the active matrix drive system.

Figure 10:
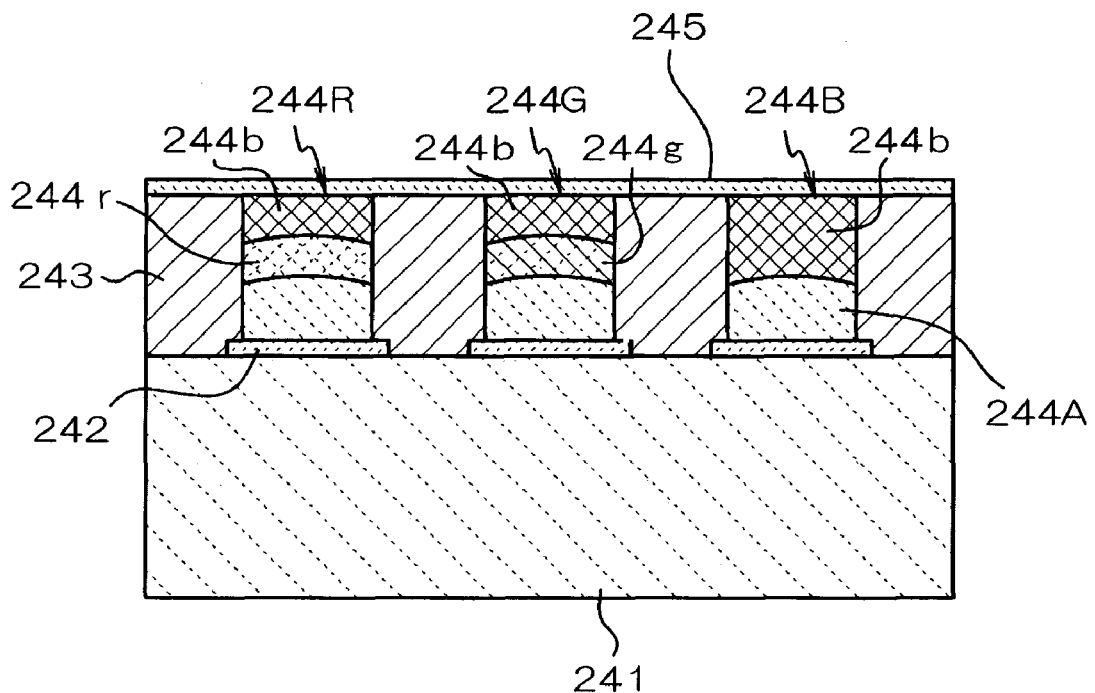
FIG. 10 is an enlarged vertical cross-sectional view illustrating the enlarged EL panel structure of the ninth embodiment.

FIG. 10 depicts a more specific configuration of the EL panel 240. As shown in FIG. 10, the EL panel 240 of the embodiment can be configured to allow color display by forming light emitting elements 244R, 244G and 244B. These light emitting elements 244R, 244G and 244B are configured of a hole injection layer 244A, and a red light emitting layer 244r, a green light emitting layer 244g, or blue light emitting layer 44b.

As materials for the hole injection layer, phthalocyanine based compounds such as copper phthalocyanine, and aromatic amine based compounds are named. In addition, as materials for the light emitting layer, aromatic ring compounds such as distyrylbenzene derivatives (blue light emission), heterocyclic compounds such as organic fluorescent materials based on aluminium complex (Alq complex) of 8-hydroxyquinoline of metal complex, and compounds containing specific elements such as a mixed ligand complex, one kind of Alq complex derivatives that one of hydroxyquinolines is substituted to triphenyl silicanol (Si compound) for coordination (blue green light emission) are named. As other light emission materials other than blue color, nitrobenzothiazole azo compounds of red color, europium complexes of red color, distyrylpyrazine of yellow color, and aromatic dimethylidyne of green color are named.

In the embodiment, the light emitting element 244R is formed of the hole injection layer 244A, the red light emitting layer 244r and the blue light emitting layer 224b, the blue light emitting layer 244b functions as a layer for securing flatness and an electron injection transport layer. In addition, the light emitting element 244G is formed of the hole injection layer 244A, the green light emitting layer 244g and the blue light emitting layer 244b, and the blue light emitting layer 244b functions as a layer for securing flatness and an electron injection transport layer. Furthermore, the light emitting element 244B is formed of the hole injection layer 244A and the blue light emitting layer 244b.

In the embodiment, a bank 243 is formed on the substrate 241 with insulating resin (such as acryl resin, epoxy resin and photosensitive polyimide), and each of the light emitting elements is formed in each pixel area partitioned by the bank 243. By adopting such a configuration, each of the light emitting elements can be formed by arranging liquid materials, liquefied by adding a solvent to each material, in each pixel area by liquid drop discharge and by drying and curing the arranged liquid materials.

In the embodiment, a predetermined voltage is applied between the electrode 242 and the counter electrode 245 of the EL panel 240 to allow the each light emitting elements to emit light. Accordingly, the light emitted from the each light emitting element passes through the retarder 230, and then enters the polarizer 220. The polarized light component having the vibration plane parallel to the transmitting polarization axis of the polarizer 220 is passed through, whereas the polarized light component having the vibration plane orthogonal to the transmitting polarization axis is absorbed. Moreover, the polarized light component having passed through the polarizer 220 enters the reflective polarizer 210, which is a first polarized light selecting unit. The reflective polarizer 210 is disposed so as to direct its transmitting polarization axis toward the same direction as that of the transmitting polarization axis of the polarizer 220. Therefore, the polarized light component having passed through the polarizer 220 travels through the reflective polarizer 210 as it is, and it is visibly recognized as the transmitted light "T" on the viewing side (the display mode).

On the other hand, when the outside light "O" enters the display device 200, the polarized light component having the vibration plane in parallel to the transmitting polarization axis of the reflective polarizer 210 passes through, but the polarized light component having the vibration plane orthogonal to the transmitting polarization axis is reflected. This reflected polarized light component "R" is unobservable when the display light emitted from the EL panel 240 passes through the reflective polarizer 210 in the display mode, and a predetermined display image formed of the display light of the EL panel 240 is visibly recognized. However, when it is configured that the light emission from the EL panel 240 is stopped so as not to emit light from the backside of the reflective polarizer 210, the visible mode recognition by the external light reflection of the reflective polarizer 210 becomes dominant to visibly recognize the display screen as a mirror (the mirror mode).

In addition, among the outside light "O," the polarized light component having the vibration plane parallel to the transmitting polarization axis of the reflective polarizer 210 passes through the reflective polarizer 210 and the polarizer 220 having the transmitting polarization axis in the same direction, and enters the retarder 230. In the retarder 230, this polarized light component travels a quarter (¼) phase to be right-handed circular polarized light, for example, and enters the EL panel 240 to be reflected by the reflecting electrode 245. This reflected light is turned to be left-handed circular polarized light. Thus, it again passes thorough the retarder 230 to be the polarized light component having the vibration plane orthogonal to the transmitting polarization axes of the reflective polarizer 210 and the polarizer 220. Therefore, the polarized light component is absorbed by the polarizer 220 as it is, and is not released to the viewing side.

Accordingly, since polarized light components of the outside light "O", which are not the polarized light components that are reflected on the surface of the reflective polarizer 210, will not return to the viewing side , the amount of the observed outside light can be reduced in the display mode. Thus, the deterioration of visibility can be reduced, and the light reflected other than in the surface of the reflective polarizer can be eliminated in the mirror mode. Therefore, a viewable mirror state with no blur can be realized.

Tenth Embodiment

Figure 11:
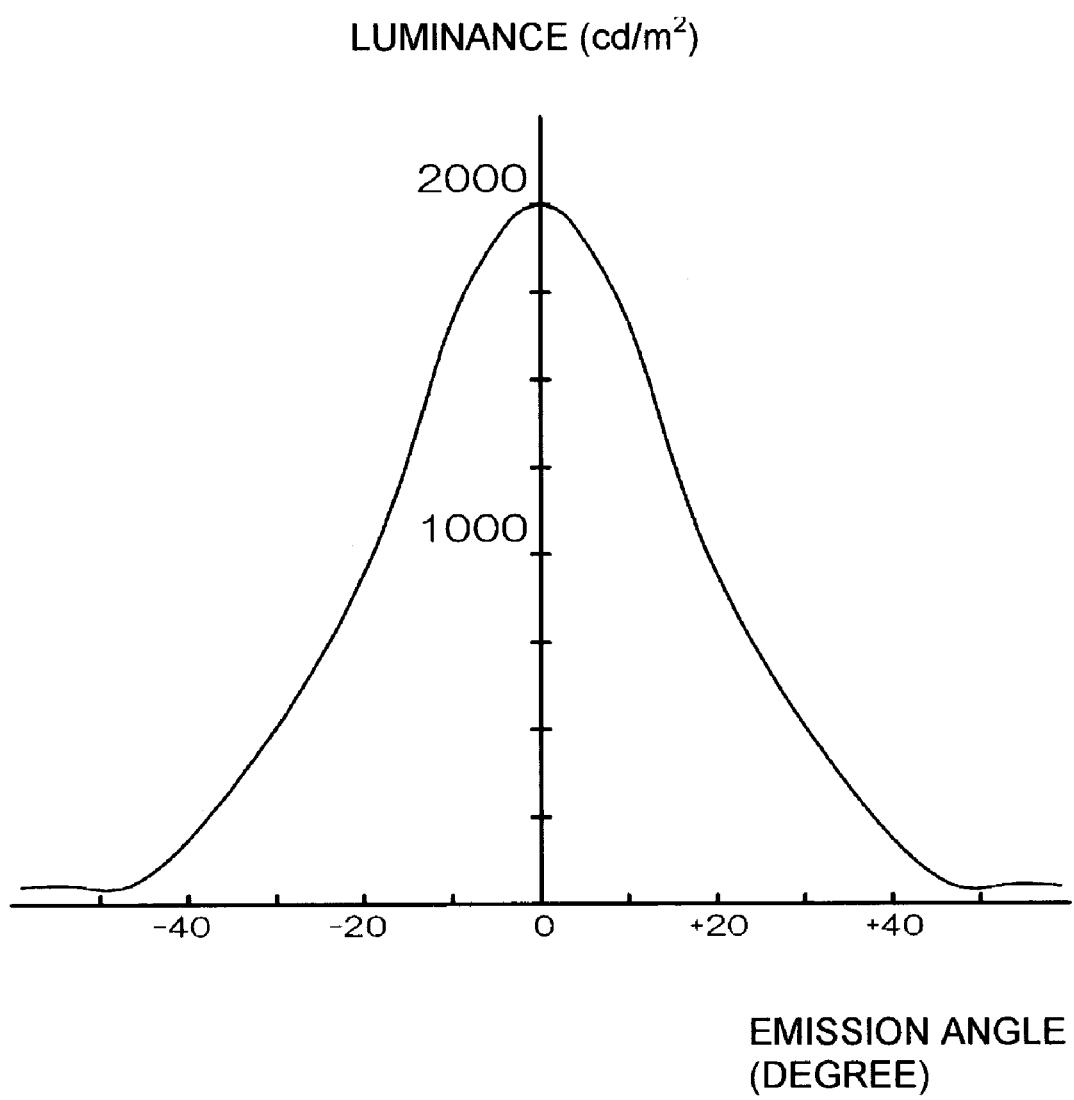
FIG. 11 is a graph illustrating the luminance of the backlight against the emission angle distribution of the tenth embodiment in the invention.

Next, an embodiment of the display device with a preferable backlight applied to the first to fourth embodiments will be described. The configuration of this embodiment can adopt any configurations of the first to ninth embodiments. FIG. 11 is a graph illustrating the luminance of the backlight against the emission angle distribution. In the embodiment, a backlight is desired that has high intensity luminance in the range of a small emission angle centering the direction normal to the display screen (emission angle=0), and has low luminance in the range of a large emission angle, which is remote from the normal direction, in order to enhance the visibility of the display image. The range of the small emission angle is an emission angle ranging from zero (0) to forty (40) degrees, and the range of the large emission angle is the range exceeding an emission angle of forty (40) degrees. In the example shown in the drawing, a luminance of about 2000 cd/m$^2$ is obtained in the light of a zero degree emission angle, whereas the luminance is dropped to 20 to 30 cd/m$^2$ in the light of a fifty (50) degree emission angle.

As for the emission angle distribution of luminous light from the backlight (lighting unit) for the embodiment, it is configured to have most light in the range of the small emission angle and to have less light in the range of the large emission angle. Thus, the light amount of the transmitted light "T" entering the user's eye can be increased in the display mode. Therefore, a reduction in the visibility of the display screen due to the reflected light "R" can be further suppressed. In order to enhance the visibility of the display screen in the display mode and to suppress the light amount of the backlight to reduce power consumption, the light emission property of the backlight is preferably configured to have a luminance (light amount) of one fiftieth (1/50) or below of the luminance (light amount) in the normal direction for the range of the large emission angle exceeding an emission angle of forty (40) degrees.

The emission angle distribution of luminous light of the backlight can be properly configured according to the shape of the light guide plate 162, the structure of the light reflection component or the light scattering component 163, and a filter or a scattering plate (diffuser) disposed separately.

The emission angle distribution of luminous light of the backlight is applicable to the emission angle distribution of display light in the EL panel 240 of the ninth embodiment as it is. More specifically, by configuring the emission angle distribution of display light of the EL panel 240 as that shown in FIG. 11, the display light can be configured to be visibly recognized efficiently with no increase in power consumption, and the visibility in the display mode can be enhanced regardless of the existence of the specular reflection light by the reflective polarizer.

Eleventh Embodiment

Figure 12:
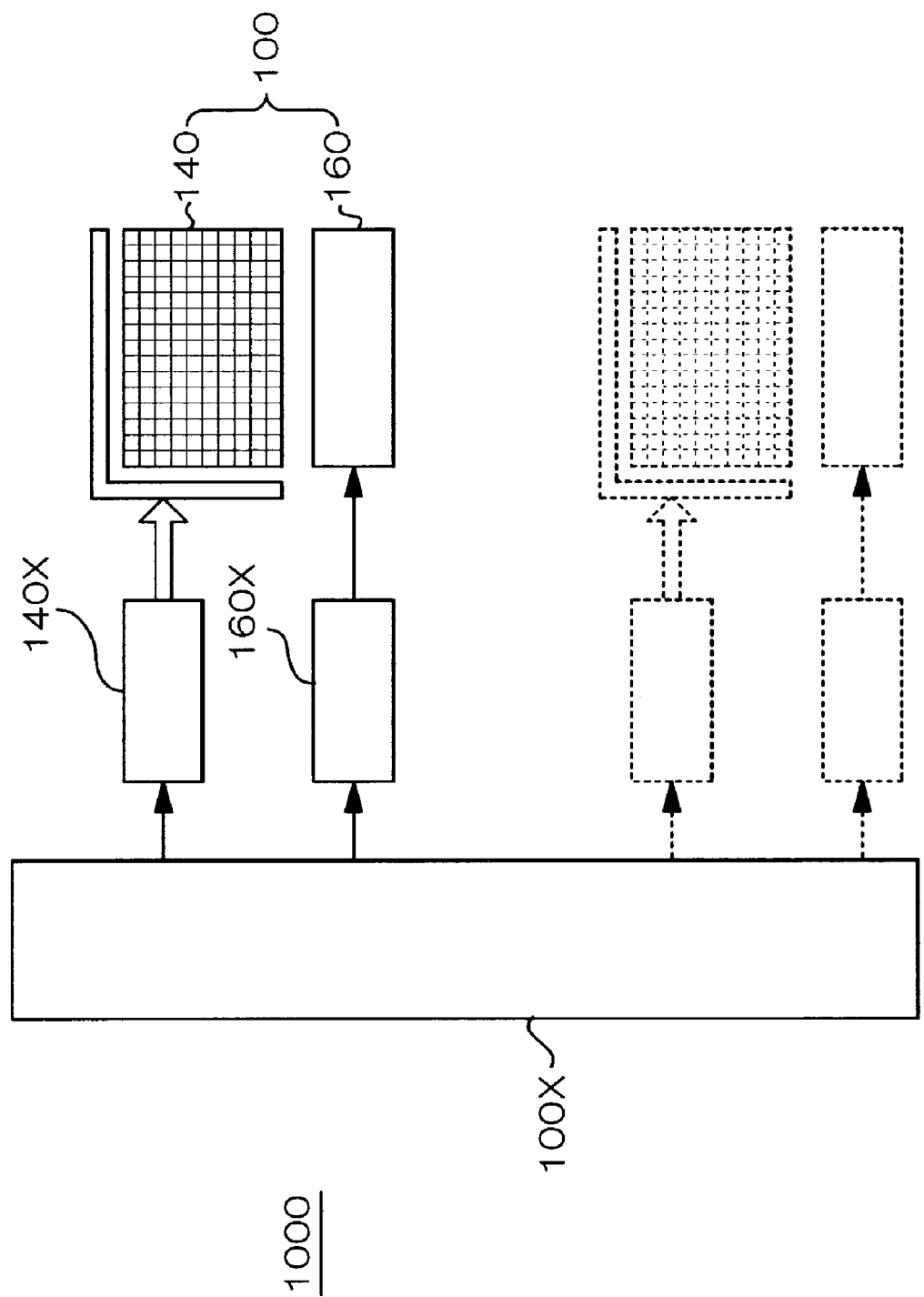
FIG. 12 is a schematic block diagram illustrating the configuration of the display control system in the electronic device provided with the display device.
Figure 13:
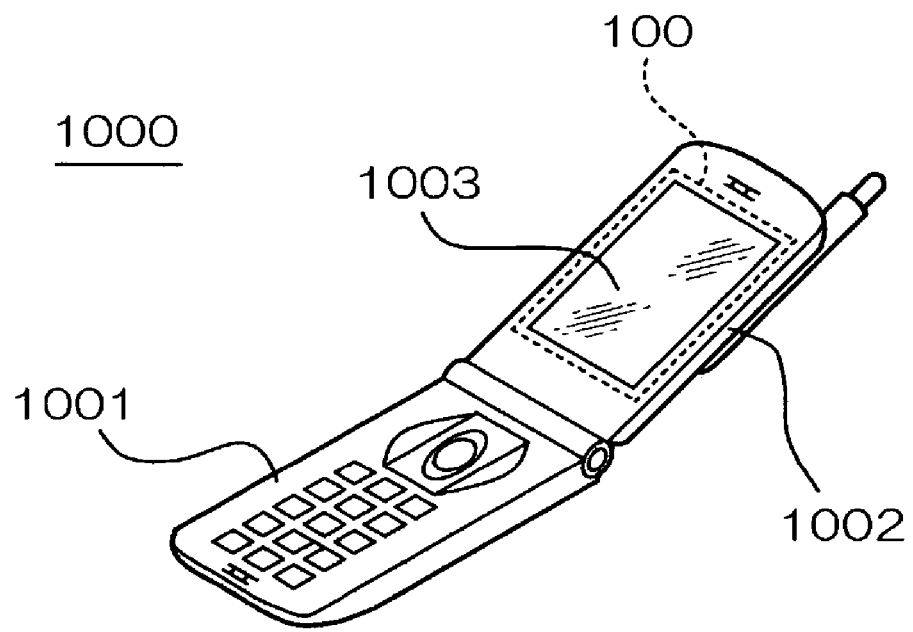
FIG. 13 is a schematic perspective view illustrating the appearance of the electronic device (mobile phone)

Next, an electronic device 1000 of an eleventh embodiment in the invention will be described with reference to FIGS. 12 and 13. This electronic device 1000 is provided with the display device 100 of the first embodiment. FIG. 12 is a schematic block diagram illustrating a display control system for the display device 100 to be disposed inside the electronic device 1000 in a form combined with a function implementing unit. FIG. 13 is a schematic perspective view illustrating the exemplary configuration of the electronic device 1000 (a mobile phone).

The electronic device 1000 is provided with a display drive part 140X for driving the liquid crystal panel 140 disposed in the display device 100, a light control part 160X for controlling the backlight 160, and a control part IOOX for controlling the display drive part 140X and the light control part 160X. By the way, the configuration shows the display control system in a form of combining with the function implementing unit, and does not depict an actual circuit configuration or the packaging structure of circuit devices. Therefore, it is acceptable that all the parts are formed in the display device 100, or formed outside the display device 100, that is, formed inside the electronic device 1000 instead of the display device 100. Furthermore, it is acceptable that a portion is formed inside the display device 100, and other portions are formed inside the electronic device 1000 instead of the display device 100.

The display drive part 140X is for feeding drive voltage to drive each of a plurality of pixel areas formed in the liquid crystal drive area of the liquid crystal panel 140. For example, it synchronously feeds scan signals and data signals corresponding to the scan signals to a common terminal (scan line terminal) and a segment terminal (data line terminal) of the liquid crystal panel 140 in the multiplex drive system or the active drive system. Display data such as image data is sent to the display drive part 140X from the main circuit of the electronic device 1000 via the control part 100X.

The light control part 160X controls power supply to the backlight 160. For example, it switches the backlight 160 between the lit state and the unlit state.

The control part 100X controls the display drive part 140X and the light control part 160X, and performs control instruction to each part and data sending. For example, when the display device 100 is to be set in the display mode, the display drive part 140X drives the liquid crystal panel 140 to display, and the light control part 160X allows the backlight 160 in the lit state simultaneously. When the display device 100 is to be set in the mirror state, the display drive part 140X controls the liquid crystal panel 140, and the liquid crystal display including the liquid crystal panel 140 is set in the full blocked state (shutter closed state). Alternatively, the light control part 160X turns off the backlight 160 to be in the unlit state. Preferably, the liquid crystal display is in a fully blocked state and the backlight 160 is in the unlit state in the mirror state.

As shown in FIG. 13, the electronic device 1000 of the embodiment can be configured as a mobile phone having a main body part 1001 and a display part 2002. In this case, it is configured that the display device 100 is disposed inside the display part 1002 to visibly recognize a display screen 1003 in the display part 1002. By configuring in this way, a predetermined display screen can be visibly recognized in the display screen 1003, or the mirror surface state can be visibly recognized depending on various manual operations and various situations. Accordingly, the electronic device 1000 such as the mobile phone can be used as a mirror.

Figure 14:
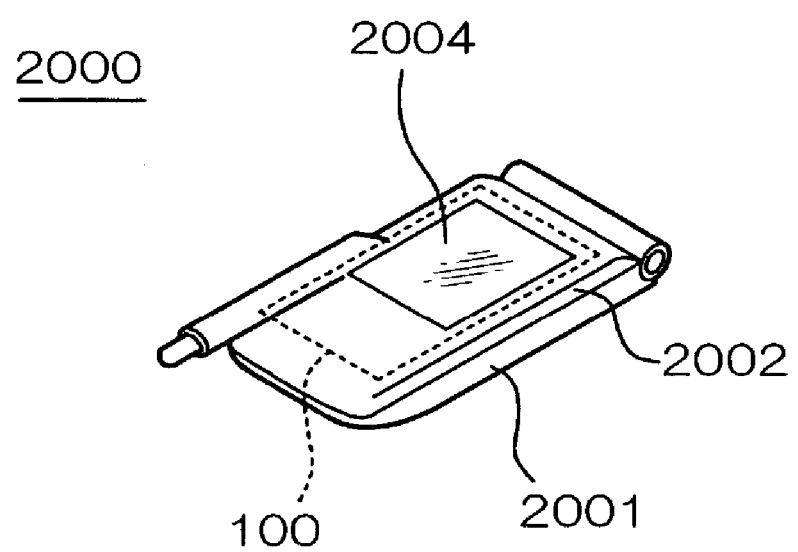
FIG. 14 is a schematic perspective view illustrating another electronic device (mobile phone).

In addition, when the electronic device 1000 is applied to a mobile phone 2000, the configuration is acceptable in which another display screen 2004, other than the main display screen (the same one as 1003) shown in FIG. 13, is disposed on the outer face of a display part 2002, folded over a main body part 2001 as shown in FIG. 14. And the display screen 2004 allows predetermined display to be visually recognized without opening the display part 2002 from the main body part 2001. In this case, the display device 100 is disposed in addition to the main display device depicted by dotted lines in FIG. 12, and thus the structure is formed in which the display screen 2004 can be visually recognized by the display device 100 other than the main display screen. In the mobile phone 2000 of the embodiment, display can be visually recognized in the folded state, and also it can be used as a mirror in the folded state.

In the embodiment, the electronic device 1000 and the mobile phone 2000 are preferably provided with an input part (control member) such as a control switch, a operation button, and a control dial for exclusively switching between the display mode (transmissive display mode) and the mirror mode, or for serving also as the input part for other functions. For example, it is configured that the control member for exclusive use or for dual purpose disposed on the main body part 1001 of the electronic device 1000 is manually operated and thus the operated state is sent to the control part 100X to switch between the display mode (transmissive display mode) and the mirror mode. Furthermore, the mobile phone 2000 is configured in which a control member, manually operable in the folded state shown in FIG. 14, is disposed and the control member is operated to send the operated state to the control part 100X for switching between the display mode (transmissive display mode) and the mirror mode. As for the dual purpose control member for forming the input part, for example, a data input key button and a power on/off button in various electronic devices such as a mobile phone and personal computer are named.

When the display device 200 having the EL panel 240 of the ninth embodiment is disposed inside the electronic device, the light control part is not needed. Instead, a control unit including functions of the control part and the display drive part can realize predetermined display states in the display mode and the mirror surface state in the mirror mode. In the mirror mode, the control unit stops light emission of the EL panel 240.

The display device and the electronic devices of the invention are not limited to the examples shown in the drawings, which can of course be modified variously within the scope of the invention. For example, in the embodiments, the case where the invention is applied to the liquid crystal device as one kind of electro-optical device, has been mainly described. However, the invention is not limited to this, but can be applied to various electro-optical devices such as the electroluminescent device as the ninth embodiment, particularly an organic electroluminescent device, an inorganic electroluminescent device, a plasma display device, an FED (field emission display) device, an LED (light emitting element) display device, an electrophoretic image display device, a small-sized TV using a low-profile CRT and a liquid-crystal shutter, and a device using a digital micromirror device (DMD).

Advantage of the Invention

As described above, according to the invention, display quality can be enhanced in the display device, which allows the display part to be switched between the display mode and the mirror mode. In addition, the display device can be formed to be low-profile and light-weight.

The entire disclosure of Japanese Patent Application Nos. 2002-183490 filed Jun. 24, 2002 and 2002-230295 filed Aug. 7, 2002 are incorporated by reference.

What is claimed is:

1. A display device comprising:
   a display unit including:
      a first polarized light selecting unit on a viewing side thereof, the first polarized light selecting unit transmitting a first polarized light and reflecting a second polarized light having a polarization axis crossing a polarization axis of the first polarized light;
      a transmitting polarization axis varying unit;
      a second polarized light selecting unit disposed between the first polarized light selecting unit and the transmitting polarization axis varying unit, the second polarized light selecting unit transmitting the first polarized light and absorbing the second polarized light; and
      a third polarized light selecting unit disposed on a backside of the transmitting polarization axis varying unit, the third polarized light selecting unit transmits a third polarized light and absorbs a fourth polarized light having a polarization axis crossing a polarization axis of the third polarized light;
   wherein no other transmitting polarization axis varying unit is disposed on the viewing side of the first polarized light selecting unit.

2. The display device according to claim 1, wherein a control unit stops light emission from the display unit in a mirror mode.

3. A display device having a transmitting polarization axis varying unit, the display device including:
   a first polarized light selecting unit disposed on a viewing side of the transmitting polarization axis varying unit; and
   a second polarized light selecting unit disposed on a backside of the transmitting polarization axis varying unit,
   wherein the first polarized light selecting unit transmits a first polarized light and reflects a second polarized light having a polarization axis crossing a polarization axis of the first polarized light,
   the second polarized light selecting unit transmits a third polarized light and one of absorbs and reflects a fourth polarized light having a polarization axis crossing a polarization axis of the third polarized light, and
   the transmitting polarization axis varying unit converts at least a part of the third polarized light to the first polarized light;
   wherein a third polarized light selecting unit adapted to transmit the first polarized light and to absorb the second polarized light is disposed between the first polarized light selecting unit and the transmitting polarization axis varying unit;
   wherein no other transmitting polarization axis varying unit is disposed on the viewing side of the first polarized light selecting unit.

4. The display device according to claim 3 comprising:
   a lighting device on the backside of the second polarized light selecting unit,
   wherein the second polarized light selecting unit transmits the third polarized light and absorbs the fourth polarized light,
   a fourth polarized light selecting unit disposed between the second polarized light selecting unit and the lighting device, and
   the fourth polarized light selecting unit transmits the third polarized light and reflects the fourth polarized light.

5. The display device according to claim 3, wherein the second polarized light selecting unit transmits the third polarized light and reflects the fourth polarized light.

6. The display device according to claim 3, wherein a surface on the viewing side of the polarized light selecting unit is flat.

7. The display device according to claim 3, wherein a transparent protective film is formed on a surface on the viewing side of the first polarized light selecting unit.

8. The display device according to claim 3, wherein a lighting unit adapted to emit light to the viewing side is disposed on the backside of the second polarized light selecting unit.

9. The display device according to claim 8, wherein no light reflection component for reflecting outside light to the viewing side in a form supporting display is disposed between the first polarized light selecting unit and the lighting unit.

10. The display device according to claim 8, wherein the transmitting polarization axis varying unit does not emit the first polarized light when the lighting unit is off.

11. The display device according to claim 3, wherein a polarized light selecting area of the first polarized light selecting unit extends beyond an area overlapping a transmitting polarization axis varying area of the transmitting polarization axis varying unit.

12. The display device according to claim 8, wherein a light amount emitted in a normal direction is greatest in an emission angle distribution of luminous light of the lighting unit.

13. The display device according to claim 12, wherein the luminous light of the lighting unit is mainly distributed at an emission angle ranging from zero (0) to forty (40) degrees.

14. The display device according to claim 12, wherein the luminous light of the lighting unit is one fiftieth ($\frac{1}{50}$) or below of a light amount in the normal direction for a range exceeding an emission angle of forty five (45) degrees.

15. The display device according to claim 3, wherein a color filter is disposed on the backside of the first polarized light selecting unit.

16. The display device according to claim 3, wherein a retarder is disposed between the first polarized light selecting unit and the transmitting polarization axis varying unit.

17. The display device according to claim 3, wherein a transparent member is disposed on the viewing side of the first polarized light selecting unit, and the first polarized light selecting unit is directly or indirectly disposed adjacent the transparent member.

18. The display device according to claim 17, wherein the first polarized light selecting unit is bonded to the transparent member by a transparent substance.

19. The display device according to claim 17, wherein a surface of the transparent member on the first polarized light selecting unit is flat.

20. The display device according to claim 17, wherein a surface on the viewing side of the transparent member is curved.

21. An electronic device comprising the display device according to claim 1.

22. An electronic device comprising:
the display device according to claim 3; and
a display drive unit adapted to drive the transmitting polarization axis varying unit.

23. An electronic device comprising:
the display device according to claim 8;
display drive unit adapted to drive the transmitting polarization axis varying unit; and
a lighting control unit adapted to control the lighting unit.

24. An electronic device comprising:
a display unit that includes:
   a first polarized light selecting unit adapted to transmit a first polarized light and to reflect a second polarized light having a polarization axis crossing a polarization axis of the first polarized light on a viewing side thereof;
   a transmitting polarization axis varying unit; and
   a second polarized light selecting unit disposed between the first polarized light selecting unit and the transmitting polarization axis varying unit, the second polarized light selecting unit transmitting the first polarized light and absorbing the second polarized light; and
a third polarized light selecting unit disposed on a backside of the transmitting polarization axis varying unit, the third polarized light selecting unit transmits a third polarized light and one of absorbs and reflects a fourth polarized light having a polarization axis crossing a polarization axis of the third polarized light;
wherein the transmitting polarization axis varying unit converts at least a part of the third polarized light to the first polarized light; and
wherein no other transmitting polarization axis varying unit is disposed on the viewing side of the first polarized light selecting unit.

25. The electronic device according to claim 24 further comprising an input part for allowing an operation of the display device or for allowing data input to display in the display device,
wherein the input part is operated to allow switching between a transmissive display mode and a mirror mode.

26. A display device comprising:
an electro-optical panel;
a first polarizer on one side of the electro-optical panel that one of reflects and absorbs light;
a reflective polarizer on the other side of the electro-optical panel; and
a second polarizer disposed between the reflective polarizer and the electro-optical panel that absorbs light;
wherein the reflective polarizer transmits a first polarized light and reflects a second polarized light that has a polarization axis that crosses a polarization axis of the first polarized light;
the second polarizer transmits the first polarized light and absorbs the second polarized light;
the first polarizer transmits a third polarized light and one of absorbs and reflects a fourth polarized light having a polarization axis crossing a polarization axis of the third polarized light; and
the electro-optic panel converts at least a part of the third polarized light to the first polarized light;
wherein no other electro-optical panel is disposed on the viewing side of the reflective polarizer.

27. The display device according to claim 26, further comprising a retarder disposed between the second polarizer and the electro-optical panel.

28. The display device according to claim 26, further comprising a retarder disposed between the reflective polarizer and the electro-optical panel.

29. The display device according to claim 26, further comprising a reflective polarizer disposed farther from the electro-optical panel than the first absorptive polarizer.

30. The display device according to claim 26, further comprising a light source disposed farther from the electro-optical panel than the first polarizer.

31. The display device according to claim 26, wherein the reflective polarizer is the outermost polarizer at the side of the electro-optical panel to which the second polarizer and the reflective polarizer are disposed.

32. A display device comprising:
a transmitting polarization axis varying unit;
a first polarized light selecting unit on a viewing side of the transmitting polarization axis varying unit, the first polarized light selecting unit transmitting a first polarized light and reflecting a second polarized light having a polarization axis crossing a polarization axis of the first polarized light;
a second polarized light selecting unit disposed on a backside of the transmitting polarization axis varying unit, the second polarized light selecting unit transmits a third polarized light and absorbs a fourth polarized light having a polarization axis crossing a polarization axis of the third polarized light; and
a lighting unit disposed on a backside of the second polarized light selecting unit, the lighting unit emitting light to the viewing side;
wherein the transmitting polarization axis varying unit converts at least a part of the third polarized light to the first polarized light;
the display device switches between a display mode, in which a display light is emitted from the transmitting polarization axis varying unit, and a mirror mode, in which the lighting unit is set in an off state or/and the transmitting polarization axis varying unit is set in a light blocking state; and
no other transmitting polarization axis varying unit is disposed on the viewing side of the first polarized light selecting unit.

33. The display device according to claim 32, wherein the transmitting polarization axis varying unit is a liquid crystal display.

34. A display device comprising:
a transmitting polarization axis varying unit;
a first polarized light selecting unit on a viewing side of a transmitting polarization axis varying unit, the first polarized light selecting unit transmitting a first polarized light and reflecting a second polarized light having a polarization axis crossing a polarization axis of the first polarized light;
a second polarized light selecting unit disposed on a backside of the transmitting polarization axis varying unit, the second polarized light selecting unit transmits a third polarized light and one of absorbs and or reflects a fourth polarized light having a polarization axis crossing a polarization axis of the third polarized light;

a third polarized light selecting unit disposed between the first polarized light selecting unit and the transmitting polarization axis varying unit, the third polarized light selecting unit transmits the first polarized light and absorbs the second polarized light; and a lighting unit disposed on a backside of the second polarized light selecting unit, the lighting unit emitting light to the viewing side;

wherein the transmitting polarization axis varying unit converts at least a part of the third polarized light to the first polarized light;

the display device switches between a display mode, in which a display light is emitted from the transmitting polarization axis varying unit, and a mirror mode, in which the lighting unit is set in an off state;

wherein an emission angle distribution of luminous light of the lighting unit in the display mode includes a greatest light amount emitting in a direction orthogonal to the display screen; and wherein no other transmitting polarization axis varying unit is disposed on the viewing side of the first polarized light selecting unit.

* * * * *